US012153373B2

(12) United States Patent
Ishii et al.

(10) Patent No.: US 12,153,373 B2
(45) Date of Patent: Nov. 26, 2024

(54) IMAGE FORMING APPARATUS HAVING DETACHABLE CARTRIDGES AND IMAGE FORMING SYSTEM

(71) Applicant: CANON KABUSHIKI KAISHA, Tokyo (JP)

(72) Inventors: Hirotaka Ishii, Shizuoka (JP); Kenji Abe, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/143,678

(22) Filed: May 5, 2023

(65) Prior Publication Data

US 2023/0273569 A1 Aug. 31, 2023

Related U.S. Application Data

(63) Continuation of application No. 17/501,141, filed on Oct. 14, 2021, now Pat. No. 11,681,256.

(30) Foreign Application Priority Data

Nov. 4, 2020 (JP) ................................ 2020-184503
Sep. 9, 2021 (JP) ................................ 2021-146732

(51) Int. Cl.
*G03G 21/18* (2006.01)
*G03G 15/08* (2006.01)
*G03G 15/16* (2006.01)

(52) U.S. Cl.
CPC ..... *G03G 21/1821* (2013.01); *G03G 15/0868* (2013.01); *G03G 15/1615* (2013.01); *G03G 21/1814* (2013.01); *G03G 21/185* (2013.01)

(58) Field of Classification Search
CPC .......... G03G 21/1821; G03G 15/0868; G03G 15/1615; G03G 21/1814; G03G 21/185;
(Continued)

(56) References Cited

U.S. PATENT DOCUMENTS 7,031,637 B2 4/2006 Fujita
7,398,038 B2 7/2008 Tsuda et al.
(Continued)

FOREIGN PATENT DOCUMENTS

CN 1450417 A 10/2003
CN 1501192 A 6/2004
(Continued)

OTHER PUBLICATIONS

Chinese Office Action dated Apr. 16, 2024, in Chinese Patent Application No. 202111292058.4.

*Primary Examiner* — Sandra Brase
(74) *Attorney, Agent, or Firm* — VENABLE LLP

(57) ABSTRACT

An image forming apparatus forms an image on a recording material and includes an apparatus body, a first process cartridge including a first photosensitive member and a first developing roller to supply first toner to the first photosensitive member, with the first process cartridge being detachably attached to the apparatus body, and a toner cartridge to accommodate the first toner and detachably attached to the apparatus body independently from the first process cartridge. A second process cartridge includes a second photosensitive member and a second developing roller to supply second toner to the second photosensitive member, with the second process cartridge being detachably attached to the apparatus body and configured not to be replenished with the second toner in a state where the second process cartridge is attached to the apparatus body.

8 Claims, 24 Drawing Sheets

(58) Field of Classification Search
CPC ........... G03G 15/6585; G03G 15/0865; G03G 15/6541; G03G 21/12; G03G 15/161
See application file for complete search history.

(56) References Cited

U.S. PATENT DOCUMENTS

| | | | | |
|---|---|---|---|---|
| 8,150,277 | B2 | 4/2012 | Takiguchi | |
| 8,543,034 | B2 | 9/2013 | Ishii | |
| 8,582,999 | B2 | 11/2013 | Tada et al. | |
| 8,652,727 | B2 | 2/2014 | Sugawara et al. | |
| 11,681,256 | B2 * | 6/2023 | Ishii | G03G 21/1814 399/111 |
| 2001/0055499 | A1 | 12/2001 | Sato | |
| 2003/0091353 | A1 | 5/2003 | Hiroshima et al. | |
| 2008/0212989 | A1 * | 9/2008 | Nagata | G03G 15/0868 399/61 |
| 2009/0060589 | A1 | 3/2009 | Tanaka | |
| 2012/0251160 | A1 | 10/2012 | Sato | |
| 2013/0051886 | A1 | 2/2013 | Watanabe et al. | |
| 2015/0037062 | A1 | 2/2015 | Shibuya | |
| 2016/0041498 | A1 * | 2/2016 | Terai | G03G 15/0865 399/262 |
| 2016/0252877 | A1 * | 9/2016 | Nakamura | G03G 21/1821 399/111 |
| 2018/0356756 | A1 | 12/2018 | Takano et al. | |
| 2019/0086832 | A1 | 3/2019 | Nohara et al. | |
| 2019/0121277 | A1 | 4/2019 | Cavill et al. | |

FOREIGN PATENT DOCUMENTS

| | | | |
|---|---|---|---|
| CN | 101526782 | A | 9/2009 |
| CN | 102193474 | A | 9/2011 |
| EP | 1455245 | A1 | 9/2004 |
| JP | H04-51259 | A | 2/1992 |
| JP | H06-273985 | A | 9/1994 |
| JP | 2003-280242 | A | 10/2003 |
| JP | 2011-008130 | A | 1/2011 |
| JP | 2013-182047 | A | 9/2013 |
| JP | 2019-164186 | A | 9/2019 |

* cited by examiner

IMAGE FORMING APPARATUS HAVING DETACHABLE CARTRIDGES AND IMAGE FORMING SYSTEM

This application is a continuation of application Ser. No. 17/501,141, filed Oct. 14, 2021.

BACKGROUND OF THE INVENTION

Field of the Invention

The present invention relates to an image forming apparatus and an image forming system for forming an image on a sheet.

Description of the Related Art

Image forming apparatuses such as printers, copying machines, and multifunction devices adopt a configuration in which a photosensitive member and members for carrying out an electrophotographic process by acting on the photosensitive member are formed as a detachable process cartridge attached to an image forming apparatus body. Japanese Patent Application Laid-Open Publication No. 2003-280242 discloses a process cartridge in which a photosensitive drum and a developing unit including a developing roller and a developer container are integrated. This system is advantageous in that the cartridge can be replaced easily but tends to have high running costs since the entire cartridge needs to be replaced when toner is consumed.

Meanwhile, Japanese Patent Application Laid-Open Publication No. H04-51259 discloses a configuration where a toner cartridge accommodating toner, or developer, to be replenished to a developing unit is detachably attached to an image forming apparatus body independently from a process cartridge including a photosensitive drum and a developing unit. The system adopting the toner cartridge is advantageous from the viewpoint of lower running costs compared to an integrated-type process cartridge in a case where mass printing is performed, since only the toner cartridge can be replaced when toner is depleted.

SUMMARY OF THE INVENTION

The present invention provides a new image forming apparatus including a detachable process cartridge.

According to one aspect of the invention, an image forming apparatus is configured to form an image on a recording material, and the image forming apparatus includes an apparatus body, a first process cartridge including a first image bearing member and a first developing roller configured to supply first toner to the first image bearing member, the first process cartridge being detachably attached to the apparatus body, a toner cartridge configured to accommodate the first toner and detachably attached to the apparatus body independently from the first process cartridge, and a second process cartridge including a second image bearing member and a second developing roller configured to supply second toner to the second image bearing member, the second process cartridge being detachably attached to the apparatus body and configured not to be replenished with the second toner in a state where the second process cartridge is attached to the apparatus body.

According to another aspect of the invention, an image forming apparatus includes an apparatus body, a process cartridge including an image bearing member and a developing roller configured to supply toner to the image bearing member, the process cartridge being detachably attached to the apparatus body, a toner cartridge configured to accommodate toner to be replenished to the process cartridge and detachably attached to the apparatus body independently from the process cartridge, a belt which is movable and formed in an endless shape, the belt which is configured to be in contact with the image bearing member on an outer surface of the belt, and on which a toner image is transferred from the image bearing member, a transfer member configured to be in contact with the outer surface of the belt to form a transfer portion and to transfer the toner image that has been transferred to the belt to a recording material at the transfer portion, and a tension roller configured to be in contact with an inner surface of the belt at a position downstream of the transfer portion and upstream of the image bearing member in a direction of rotation of the belt and to stretch the belt, wherein the toner cartridge is at a position overlapped with the process cartridge when viewed in a moving direction of the belt between the tension roller and the image bearing member.

According to still another aspect of the invention, an image forming apparatus includes an apparatus body, a first process cartridge including a first image bearing member and a first developing roller configured to supply first toner to the first image bearing member, the first process cartridge being detachably attached to the apparatus body, a first toner cartridge configured to accommodate the first toner and detachably attached to the apparatus body independently from the first process cartridge, a second process cartridge including a second image bearing member and a second developing roller configured to supply second toner to the second image bearing member, the second process cartridge being detachably attached to the apparatus body, a second toner cartridge configured to accommodate the second toner and detachably attached to the apparatus body independently from the second process cartridge, a belt which is movable and formed in an endless shape, which is configured to be in contact with the first image bearing member and the second image bearing member on an outer surface of the belt, and on which toner images are transferred from the first image bearing member and the second image bearing member, a transfer member configured to be in contact with the outer surface of the belt to form a transfer portion and to transfer the toner images having been transferred to the belt to a recording material at the transfer portion, and a tension roller configured to be in contact with an inner surface of the belt at a position downstream of the transfer portion and upstream of the first image bearing member and the second image bearing member in a direction of rotation of the belt and to stretch the belt, wherein the first toner cartridge and the second toner cartridge are each at a position overlapped with the first process cartridge and the second process cartridge when viewed in a moving direction of the belt between the tension roller and the first image bearing member.

Further features of the present invention will become apparent from the following description of exemplary embodiments with reference to the attached drawings.

DESCRIPTION OF THE EMBODIMENTS

Embodiments of the present disclosure will be described below with reference to the drawings.

First Embodiment

Figure 1:
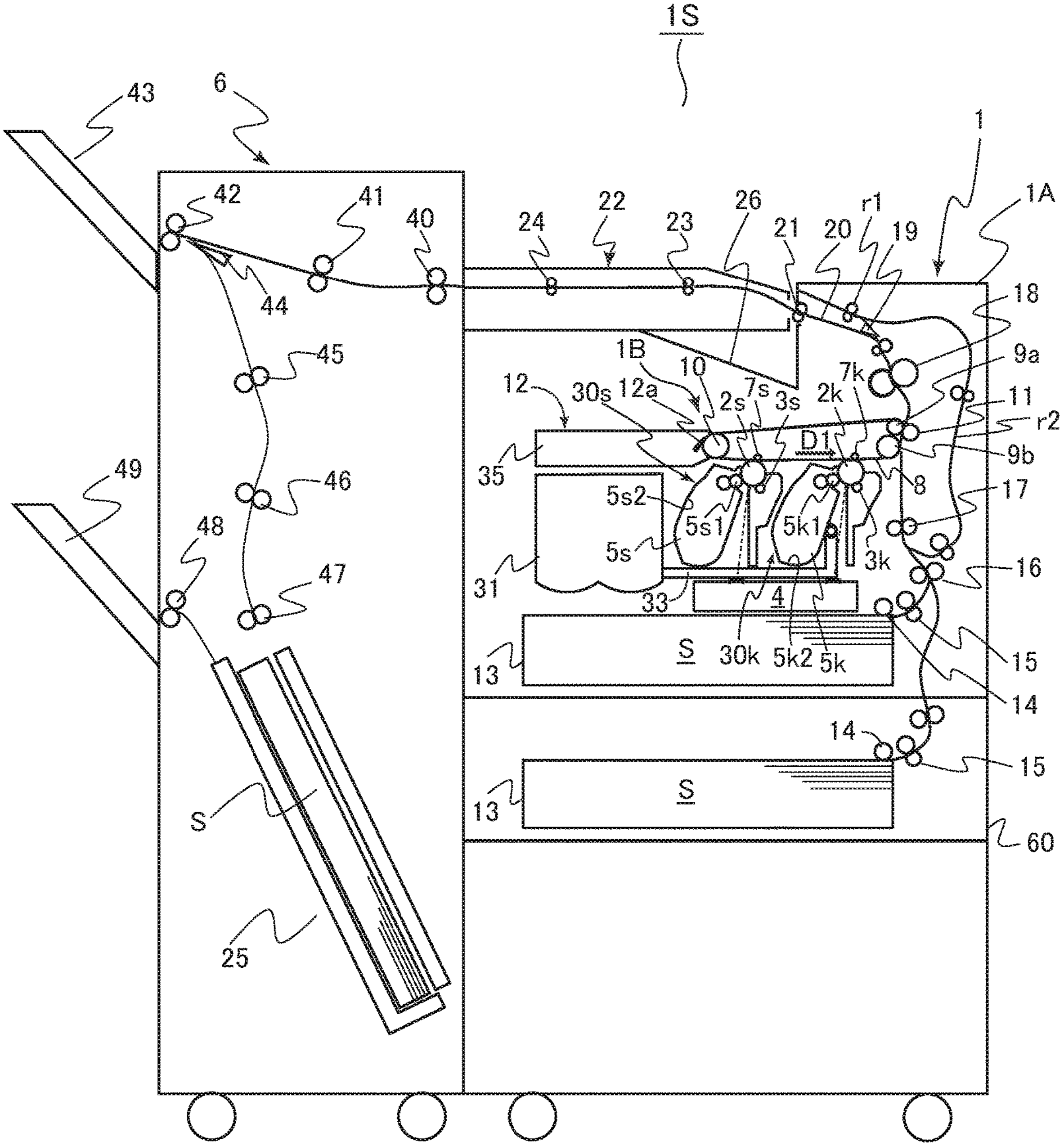
FIG. 1 is a schematic drawing of an image forming system according to a first embodiment.

FIG. 1 is a schematic drawing of an image forming system 1S according to a first embodiment. The image forming system 1S is composed of an image forming apparatus 1 and a postprocessing apparatus 6. The image forming system 1S forms an image on a sheet serving as a recording material in the image forming apparatus 1, subjects the sheet to processing in a postprocessing apparatus as needed, and outputs the sheet as a product. Various sheet materials of different sizes and materials can be used as a sheet S, such as paper including normal paper and thick paper, plastic films, cloth, sheet materials subjected to surface treatment such as coated paper, and special sheets such as envelopes and index paper.

General Configuration of Image Forming Apparatus

The image forming apparatus 1 is an electrophotographic apparatus having an image forming unit 1B of an electrophotographic system arranged in an interior of an apparatus body 1A. The image forming unit 1B includes an intermediate transfer belt 8 serving as an intermediate transfer body, and process cartridges 30*s* and 30*k* that are arranged along the intermediate transfer belt 8. The process cartridges 30*s* and 30*k* include photosensitive drums 2*s* and 2*k* serving as image bearing members, i.e., electrophotographic photosensitive members, charging devices 3*s* and 3*k*, and developing units 5*s* and 5*k*, wherein the process cartridges 30*s* and 30*k* are detachably attached to the apparatus body 1A independently from each other. The developing units 5*s* and 5*k* include containers 5*s*2 and 5*k*2 that accommodate toner serving as developer and developing rollers 5*s*1 and 5*k*1 that are supported rotatably on the container and serving as developer bearing members that bear toner and rotate.

The process cartridge 30*k* is a first process cartridge, i.e., first cartridge, that performs image formation using first toner. The photosensitive drum 2*k* is a first image bearing member according to the present embodiment, and the developing roller 5*k*1 is a first developing roller according to the present embodiment. The process cartridge 30*s* is a second process cartridge, i.e., second cartridge, that performs image forming using second toner. The photosensitive drum 2*s* is a second image bearing member according to the present embodiment, and the developing roller 5*s*1 is a second developing roller according to the present embodiment. The "apparatus body 1A" of the image forming apparatus 1 denotes a portion of the image forming apparatus 1 excluding the process cartridges 30*s* and 30*k* and a toner cartridge 31. The apparatus body 1A includes a frame part such as a metal frame constituting a frame body of the image forming apparatus 1 and a member fixed to the frame body and constitutes a mounting space in which the process cartridges 30*s* and 30*k* and the toner cartridge 31 are mounted.

The process cartridge 30*k* uses black toner to form a toner image that records an image on a sheet S. The process cartridge 30*s* applies transparent toner in the form of powder adhesive, which is hereinafter referred to as adhesive toner, to form a toner image using adhesive toner on the sheet S. That is, according to the present embodiment, black toner is used as first toner and adhesive toner is used as second toner. Toner particles made of the same components and manufacturing method as black toner only without the coloring component can be used as adhesive toner, and for example, toner having a lower melting point than black toner due to higher content rate of wax component can be used suitably. Further according to the present embodiment, transparent toner is used as the adhesive toner accommodated in the process cartridge 30*s*, but for example, white toner can also be used as the powder adhesive. Even further, the toner image formed by adhesive toner is transparent, so that it differs from a normal toner image for recording an image on the sheet S, but unless denoted otherwise, the "toner image" in the following description also includes toner image formed of adhesive toner.

The toner cartridge 31 accommodating black toner for replenishment to the process cartridge 30*k* is detachably attached to the apparatus body 1A independently from the process cartridges 30*s* and 30*k*, and it is connected via a toner conveying pipe 33 to the process cartridge 30*k*. The toner replenishing path from the toner cartridge 31 to the process cartridge 30*k* will be described later.

A scanner unit 4 serving as an exposure portion, or exposure unit, is arranged below the process cartridges 30*s* and 30*k* in the apparatus body 1A. A cassette 13, also referred to as a sheet tray or storage, serving as a supporting portion for supporting the sheets S used for image forming is inserted in a drawable manner to the apparatus body 1A below the scanner unit 4. Further, an optional sheet feeding apparatus 60 including the cassette 13 can be connected to an area below the apparatus body 1A.

The intermediate transfer belt 8 is a movable, or rotatable, belt that is formed in an endless shape and is stretched across a driving roller 9*a*, a stretching roller 9*b* and a tension roller 10 each of which rotates about an axis parallel to one another, and the intermediate transfer belt 8 is moved, i.e., rotated, or conveyed, in a counterclockwise direction in the drawing by rotation of the driving roller 9*a*. Primary transfer rollers 7*k* and 7*s* serving as primary transfer members are each arranged at a position on an inner circumference side of the intermediate transfer belt 8 opposing the photosensitive drum 2*k* or 2*s* via the intermediate transfer belt 8. A secondary transfer roller 11 serving as a transfer member, i.e., secondary transfer member, is arranged on an outer circumference side of the intermediate transfer belt 8 at a position facing the driving roller 9*a* via the intermediate transfer belt 8. That is, the tension roller 10 abuts against an inner surface of the intermediate transfer belt 8 at a position downstream of the transfer portion and upstream of the image bearing member, i.e., the photosensitive drums 2*k* and 2*s*, in the direction of rotation of the intermediate transfer belt 8 and stretches the intermediate transfer belt 8. A secondary transfer portion serving as a transfer portion is formed as a nip portion between the intermediate transfer belt 8 and the secondary transfer roller 11. The intermediate transfer belt 8, the primary transfer rollers 7*k* and 7*s* and the secondary transfer roller 11 constitute a transfer unit for transferring the toner image formed on the photosensitive drums 2*k* and 2*s* serving as image bearing members to the sheet S.

A belt cleaner 12 serving as a cleaning portion for cleaning the intermediate transfer belt 8 is arranged at a position opposing the tension roller 10 via the intermediate transfer belt 8. The belt cleaner 12 includes a cleaning member 12*a* such as a blade or a brush that is arranged to abut against the intermediate transfer belt 8 to remove attached substances such as transfer residual toner from the intermediate transfer belt 8, and a waste toner container 35 serving as a collection container for collecting attached substances having been removed by the cleaning member 12*a*.

A fixing unit 18 serving as a fixing portion is arranged above the secondary transfer portion in the apparatus body 1A. The fixing unit 18 adopts a configuration of a heat fixing system in which fixing of toner image is performed using heat, and for example, the fixing unit 18 includes a fixing roller and a pressure roller for nipping and conveying the sheet S, and a heat source, such as a halogen lamp, for heating the toner image on the sheet S via the fixing roller.

Image Forming Operation

When the image forming apparatus 1 executes an image forming operation, sheets S are fed from the cassette 13 arranged at the lower portion of the apparatus body 1A or the cassette 13 in the sheet feeding apparatus 60 via a feed roller 14 serving as a feeding member, and the sheets S are separated one by one and conveyed by a separation roller pair 15. The sheet S is conveyed by a drawing roller 16 toward a registration roller pair 17 and skewing of the sheet S is corrected by having a leading edge of the sheet S abut against a nip portion of the registration roller pair 17 in a stopped state. The registration roller pair 17 sends the sheet S to the secondary transfer portion at a timing synchronized with the progress of a toner image forming process by the image forming unit 1B.

Meanwhile, in the image forming unit 1B, the photosensitive drums 2*s* and 2*k* rotate and the charging devices 3*s* and 3*k* uniformly charge the surface of the photosensitive drums 2*s* and 2*k*. The scanner unit 4 irradiates laser light to the photosensitive drum 2*k* and forms an electrostatic latent image based on image information representing the image to be recorded on the sheet S. The electrostatic latent image is visualized as a black toner image by the developing unit 5*k* developing the image using (i.e., by supplying) black toner. Further, in a case where a binding process described later is to be performed by the postprocessing apparatus 6, the scanner unit 4 irradiates laser light to the photosensitive drum 2*s* and forms an electrostatic latent image based on information indicating an adhesion position of the sheet S. The electrostatic latent image is developed by the developing unit 5*s* using (i.e., by supplying) adhesive toner, by which the toner image of adhesive toner is formed on the area of the photosensitive drum 2*s* corresponding to the adhesion position on the sheet S.

The toner images formed on the photosensitive drums 2*s* and 2*k*, i.e., on the image bearing members, are transferred, i.e., primarily transferred, by the primary transfer rollers 7*s* and 7*k* to the intermediate transfer belt 8 and conveyed by the rotation of the intermediate transfer belt 8 toward the secondary transfer portion. By having a voltage applied to the secondary transfer roller 11 at the secondary transfer portion, the toner image is transferred, i.e., secondarily transferred, to the sheet S conveyed from the registration roller pair 17. The sheet S having passed through the secondary transfer portion is sent to the fixing unit 18, and the toner image is heated and pressed while passing through the nip portion formed by the fixing roller and the pressure roller, by which the toner is softened and solidified, and the image is thereby fixed to the sheet S.

A conveyance path of the sheet S having passed through the fixing unit 18 is switched by a switching portion 19. In the case of simplex printing, or single-sided printing, the sheet S is guided to a sheet discharge path 20 by the switching portion 19 and discharged from the apparatus body 1A by a sheet discharge roller pair 21. In the present embodiment, the image forming apparatus 1 is connected to the postprocessing apparatus 6 via a relay conveyance unit 22, and the sheet S discharged from the sheet discharge roller pair 21 is conveyed via the conveyance roller pairs 23 and 24 of the relay conveyance unit 22 to the postprocessing apparatus 6. Further, in a case where the relay conveyance unit 22 and the postprocessing apparatus 6 are not connected, the sheet discharge roller pair 21 discharges the sheet S serving as product onto a supporting tray 26 provided on an upper part of the apparatus body 1A.

In the case of duplex printing, or double-sided printing, the sheet S having an image formed on a first side is guided by the switching portion 19 to a reverse conveyance roller pair r1, subjected to reverse conveyance, i.e., switchback conveyance, by the reverse conveyance roller pair r1, and then conveyed via a duplex conveyance path r2 toward the registration roller pair 17. Then, the sheet S is passed through the secondary transfer portion and the fixing unit 18 to have an image formed on a second side opposite to the first side, and thereafter, discharged from the apparatus body 1A by the sheet discharge roller pair 21.

Postprocessing Apparatus

The postprocessing apparatus 6 is a sheet processing apparatus including a binding device 25 that provides a binding process, i.e., bonding process, to the sheet S, and the postprocessing apparatus 6 subjects a plurality of sheets S to which an image has been formed by the image forming apparatus 1 to a binding process and discharges the sheets as a sheet bundle. Further, the postprocessing apparatus 6 can simply discharge the sheet S on which image has been formed by the image forming apparatus 1 without performing a binding process thereto.

The postprocessing apparatus 6 receives the sheet S from the relay conveyance unit 22 via an inlet roller pair 40 and discharges the sheet S via a conveyance roller pair 41 to a sheet discharge roller pair 42. If the binding process is not to be performed, the sheet S is discharged onto an upper sheet discharge tray 43 by the sheet discharge roller pair 42. If the binding process is to be performed, the sheet discharge roller pair 42 subjects the sheet S to reverse conveyance, and the sheet S is guided via a switching member 44 to a conveyance path leading to the binding device 25. After a predetermined number of sheets S are sequentially conveyed via conveyance roller pairs 45, 46 and 47 along the conveyance path and are stacked on the binding device 25, the binding device 25 performs the operation described later to subject the sheets S to a binding process. The sheet bundle having been subjected to the binding process is discharged from the binding device 25 and further discharged to the exterior of the postprocessing apparatus 6 by a sheet bundle discharge roller pair 48 to be supported on a lower sheet discharge tray 49.

Process Cartridge and Toner Cartridge

A cartridge mounted on the image forming apparatus 1 according to the present embodiment will now be described. As described above, the process cartridge 30*k* using black toner, the process cartridge 30*s* using adhesive toner, and the toner cartridge 31 accommodating toner for replenishment are detachably attached to the apparatus body 1A of the image forming apparatus 1.

When the black toner in the developing unit 5*k* of the process cartridge 30*k* is consumed through repeated image forming operations, the black toner is replenished from the toner cartridge 31 via a replenishing path described later to the developing unit 5*k*. If black toner is to be supplied, or loaded, to the image forming apparatus 1, the toner cartridge 31 can be replaced while the process cartridge 30*k* is still in a mounted state. Meanwhile, if the adhesive toner in the process cartridge 30*s* is consumed, the entire process cartridge 30*s* including the photosensitive drum 2*s* and the developing unit 5*s* needs to be replaced. The process cartridge 30*k* would be replaced when the photosensitive drum 2*k* of the process cartridge 30*k* reaches its service life.

In general, frequency of use of adhesive toner is considered to be lower than frequency of use of black toner. Even if the adhesive toner is used, the amount of use per each image forming operation is considered to be smaller than that of black toner. The reason for this is because the binding process is not always performed when the image forming operation is performed, and even if the binding process is performed, adhesive toner is usually transferred to only a limited area. Therefore, by enabling black toner which is consumed relatively quickly to be replenished from the toner cartridge 31 to the process cartridge 30*k*, the frequency of replacement of the process cartridge 30*k* can be suppressed and running costs can be cut down.

Meanwhile, adhesive toner is consumed slower than black toner, so that frequent replacement of the process cartridge 30*s* is not considered to be necessary. Therefore, users can perform the replacement operation easily by adopting an integrated, i.e., independent, configuration of replacing the entire cartridge for the process cartridge 30*s*, instead of adopting a toner cartridge-type configuration. Further, one toner cartridge can be omitted compared to the case where a toner cartridge-type configuration is adopted for the process cartridge 30*s*, so that the capacity of the toner cartridge 31 can be increased accordingly. As described, the configuration of the present embodiment can be suitably applied in a case where the speeds of consumption differ greatly among various toner types.

Modified Example of Cartridge

In the present embodiment, adhesive toner is accommodated in the process cartridge 30*s*, but customized color toner, that is, transparent toner or colored toner other than black toner, such as gold, silver and clear toner can also be used in accordance with the application of use by the user. In other words, the process cartridge 30*s* can be suitably utilized as a customized process cartridge that accommodates toner other than the toner mainly used for recording an image on a sheet. Further, colored toner other than black can be accommodated in the process cartridge 30*k* and the toner cartridge 31. In other words, the first toner and the second toner can be varied according to the actual configuration of the image forming apparatus 1.

Further according to the present embodiment, the image forming apparatus 1 including two process cartridges 30*s* and 30*k* and one toner cartridge 31 has been described, but the number of process cartridges and toner cartridges can be varied. For example, a configuration including three process cartridges and two toner cartridges can be adopted. If the number of cartridges is varied, a portion of the plurality of process cartridges can be a replenishing type in which toner can be replenished from either one of the toner cartridges and the rest of the process cartridges can be an integrated type, i.e., independent type, in which toner is not replenished from the toner cartridges.

According to the present embodiment, the process cartridge 30*k* that receives toner replenishment from the toner cartridge 31 and the integrated-type, i.e., independent-type, process cartridge 30*s* that does not receive toner replenishment basically adopt the same configuration. However, the integrated-type, i.e., independent-type, process cartridge 30*s* can adopt a different configuration as the process cartridge 30*k* that receives toner replenishment. For example, the capacity of the developing unit 5*s* of the process cartridge 30*s* can be set greater than the capacity of the developing unit 5*s* of the process cartridge 30*k* to ensure initial loading quantity of adhesive toner. Further, the process cartridge 30*s* can adopt a configuration where a toner container for replenishing adhesive toner to the developing unit 5*s* is provided in addition to the configuration common to the process cartridge 30*k*.

Cartridge Arrangement

Next, the arrangement of the process cartridges 30*s* and 30*k* and the toner cartridge 31 will be described. As illustrated in FIG. 1, the process cartridges 30*s* and 30*k* are arranged along a conveyance direction of the intermediate transfer belt 8. Specifically, the process cartridges 30*s* and 30*k* are each arranged on right and left sides at a lower side of the intermediate transfer belt 8 so that the photosensitive drums 2*s* and 2*k* abut against an outer surface of the intermediate transfer belt 8 traveling in right and left directions in the drawing between the tension roller 10 and the stretching roller 9*b*.

The direction in which the intermediate transfer belt 8 moves from the tension roller 10 serving as a first roller stretching the intermediate transfer belt 8 toward the stretching roller 9*b* serving as the second roller is hereinafter referred to as a conveyance direction D1 of the intermediate transfer belt 8. In the present embodiment, the process cartridges 30*s* and 30*k* are arranged side by side approximately in parallel with the conveyance direction D1 of the intermediate transfer belt 8. When viewed in the conveyance direction D1 of the intermediate transfer belt 8, rotational axes of the two photosensitive drums 2*s* and 2*k* are at an approximately overlapped positional relationship with one another, and the developing units 5*s* and 5*k* are also overlapped with one another. That is, when viewed in the conveyance direction D1 of the intermediate transfer belt 8, the occupation areas of the two process cartridges 30*s* and 30*k* are at least partially overlapped, and preferably, the areas approximately coincide.

The process cartridge 30*k* using black toner is arranged downstream of the process cartridge 30*s* using adhesive toner in the conveyance direction D1 of the intermediate transfer belt 8. That is, the position of the primary transfer portion where the toner image of black toner is transferred from the photosensitive drum 2*k* to the intermediate transfer belt 8 is closer to the secondary transfer portion than the position of the primary transfer portion where the toner image of adhesive toner is transferred from the photosensitive drum 2*s* to the intermediate transfer belt 8. In other words, the present embodiment adopts a configuration where the second process cartridge, the first process cartridge, and the transfer portion are arranged in this order in the moving direction of the intermediate transfer belt 8. According to this configuration, regarding a command to execute the image forming operation, i.e., job, that does not use adhesive toner, waiting time from entry of the job until an image is formed on the first sheet S and the first sheet S is discharged from the image forming system 1S, hereinafter referred to as FPOT: First Print-Out Time, can be shortened.

The reason why the FPOT is shortened according to the arrangement of the present embodiment will be described in detail. In a case where a job that does not use adhesive toner is entered in the image forming operation described above, the waiting time from when the scanner unit 4 starts to form an electrostatic latent image on the photosensitive drum 2*k* to which the toner image of black toner reaches the secondary transfer portion is referred to as T. The waiting time T includes a time required from when the photosensitive drum 2*k* rotates from an exposure position by the scanner unit 4 to an abutment position with the intermediate transfer belt 8, i.e., primary transfer portion, and a time required from when the intermediate transfer belt 8 is conveyed from the abutment position with the photosensitive drum 2*k* to the secondary transfer portion. Meanwhile, when considering a case where the arrangements of the process cartridges 30*s* and 30*k* are reversed, the position of the photosensitive drum 2*k* will be displaced upstream in the conveyance direction D1 of the intermediate transfer belt 8 until it reaches the position of the photosensitive drum 2*s* in FIG. 1. As a result, since the distance in which the toner image is conveyed by the intermediate transfer belt 8 to the secondary transfer portion is extended, the waiting time T described above is also extended. Since the registration roller pair 17 of the image forming apparatus 1 conveys the sheet to the secondary transfer portion at a synchronized timing with the reaching of the toner image to the secondary transfer portion, if the waiting time T is extended, the starting of transfer of the toner image to the sheet is delayed, and the FPOT is extended compared to the present embodiment. In other words, according to the arrangement of the preset embodiment, the toner image of black toner reaches the secondary transfer portion faster, so that the FPOT can be shortened.

Figure 2:
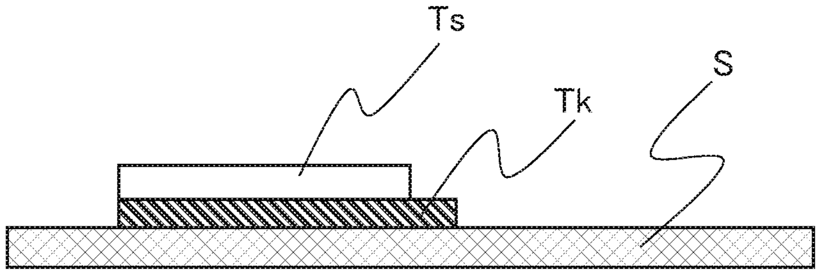
FIG. 2 illustrates layers of toner transferred to a sheet according to the first embodiment.

According further to the arrangement of the present embodiment, the toner image of black color is transferred to the intermediate transfer belt 8 after the toner image of adhesive toner has been transferred thereto. Therefore, if the image areas of black toner and adhesive toner are mutually overlapped, black toner is superposed on the adhesive toner on the intermediate transfer belt 8. Then, when black toner and adhesive toner are secondarily transferred to the sheet S at the secondary transfer portion, as illustrated in FIG. 2, adhesive toner Ts is superposed on black toner Tk on the sheet S, and adhesive toner Ts is positioned as an outermost layer. Since adhesive toner Ts for bonding the sheets S together is exposed on the outermost layer, adhesive property can be improved compared to a case where the adhesive toner Ts is covered by a layer of another toner.

The toner cartridge 31 is arranged side by side with the process cartridges 30*s* and 30*k* along the conveyance direction D1 of the intermediate transfer belt 8. In other words, the present embodiment adopts a configuration where the toner cartridge, the second process cartridge, the first process cartridge, and the transfer portion are arranged in this order in the moving direction of the intermediate transfer belt 8. The toner cartridge 31 is arranged upstream of the process cartridges 30*s* and 30*k* in the conveyance direction D1 of the intermediate transfer belt 8 and below the belt cleaner 12. When viewed in the conveyance direction D1 of the intermediate transfer belt 8, at least a portion of the toner cartridge 31 is overlapped with the process cartridges 30*s* and 30*k*.

It may be possible to arrange the toner cartridge 31 adjacent to the process cartridge 30*k* and in the area between the process cartridges 30*s* and 30*k* in order to shorten the replenishing path from the toner cartridge 31 to the process cartridge 30*k*. Note that, according to the modified example, the primary transfer portion of the process cartridge 30*s* moves upstream in the conveyance direction D1 and away from the secondary transfer portion compared to the present embodiment, which is considered to cause the FPOT of the job using adhesive toner Ts to be extended. Further, since the process cartridges 30*s* and 30*k* are separated, it may be needed to extend the circumference of the intermediate transfer belt 8 and to increase the size of the scanner unit 4 compared to the present embodiment. By arranging the process cartridges 30*s* and 30*k* adjacent one another and arranging the toner cartridge 31 upstream thereof as according to the present embodiment, it becomes possible to shorten the FPOT and downsize the apparatus. The arrangements of the toner cartridge 31 and the process cartridges 30*s* and 30*k* can be varied arbitrarily, and the order in which they are arranged in the conveyance direction D1 can be changed, or an arrangement other than the arrangement approximately parallel to the conveyance direction D1 can be adopted.

Toner Replenishing Path

Figure 3:
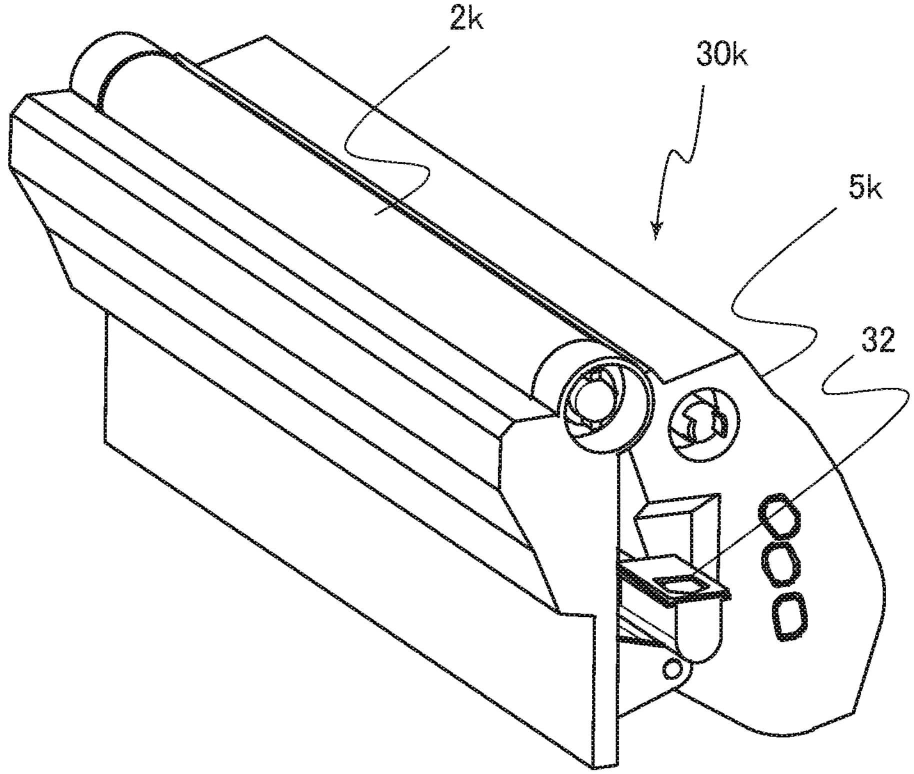
FIG. 3 is a rear side perspective view of a replenishing-type process cartridge according to the first embodiment.
Figure 4:
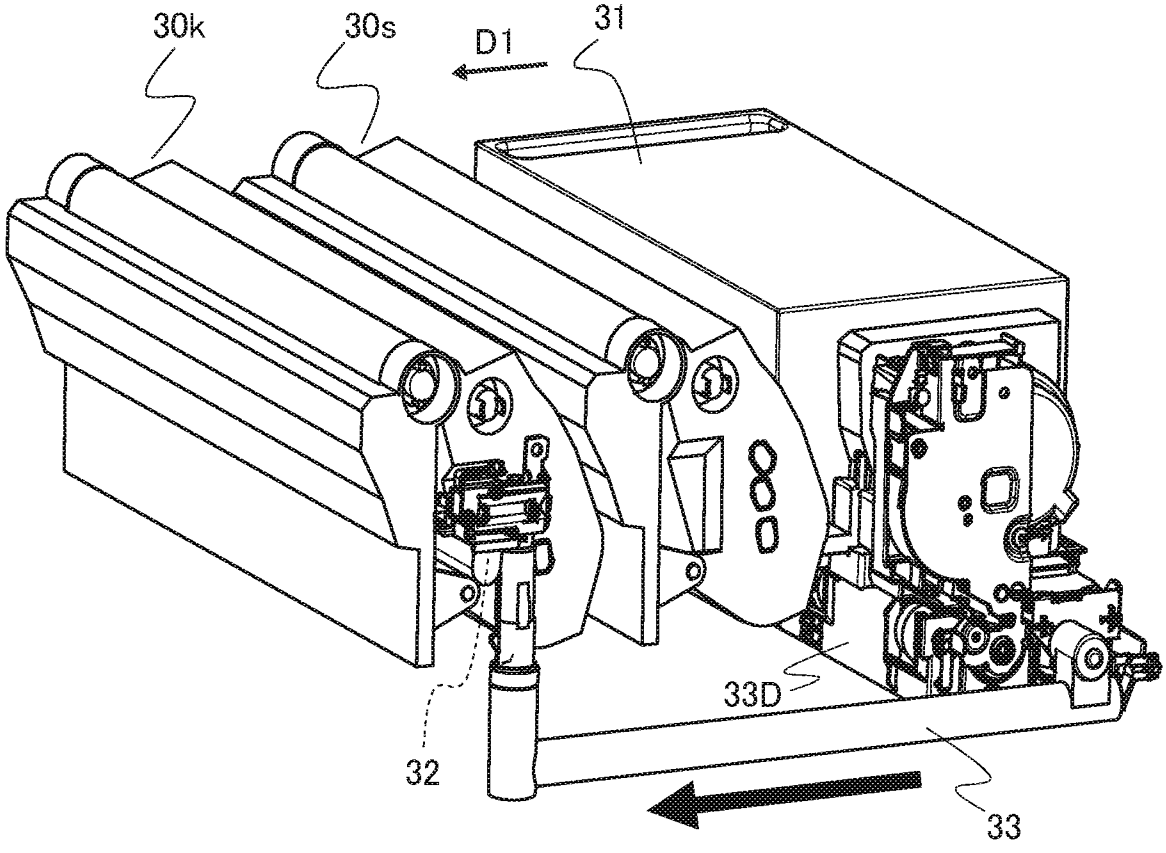
FIG. 4 illustrates a toner replenishing path according to the first embodiment.

Next, a toner replenishing configuration of the process cartridge 30*k* will be described with reference to FIGS. 3 and 4. FIG. 3 is a perspective view of the process cartridge 30*k* having a replenishing port 32 for replenishing toner. FIG. 4 is a view illustrating a toner replenishing path. FIGS. 3 and 4 are both illustrations of a view from a rear side of the image forming apparatus 1, that is, depth side of FIG. 1.

As illustrated in FIG. 3, the replenishing port 32 is arranged on the rear side of the process cartridge 30*k*. The replenishing port 32 is communicated with a space inside the developing unit 5*k* of the process cartridge 30*k*. As illustrated in FIG. 4, the replenishing port 32 is connected to a discharge port of the toner cartridge 31 via the toner conveying pipe 33 provided in the apparatus body 1A. A screw not shown is arranged inside the toner conveying pipe 33. By having the screw driven by a drive unit 33D, toner is conveyed from the toner cartridge 31 to the process cartridge 30*k*, and toner is replenished to the process cartridge 30*k*.

Meanwhile, the process cartridge 30*s* using adhesive toner does not have a replenishing port communicated with the exterior, or the process cartridge 30*s* may have a replenishing port that is covered by a lid member, so that it will not receive replenishment of toner from a toner cartridge while being mounted to the apparatus body 1A. Therefore, if the remaining amount of adhesive toner within the process cartridge 30*s* becomes small, the entire body of the process cartridge 30*s* is removed from the apparatus body 1A and replaced with a process cartridge 30*s* filled with adhesive toner.

Figure 5:
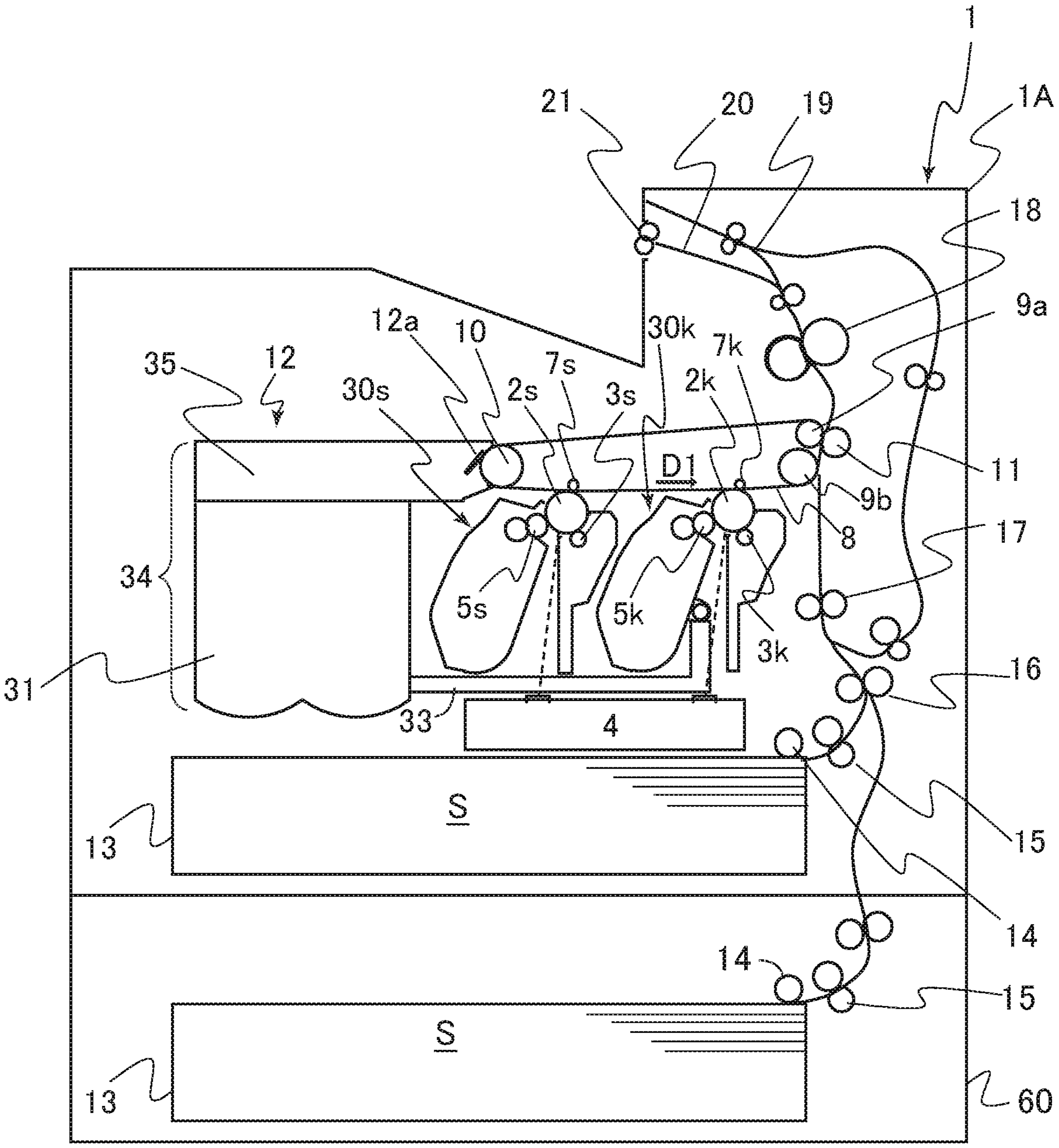
FIG. 5 illustrates a modified example of a toner cartridge according to the first embodiment.

The toner cartridge 31 according to the present embodiment is detachably attached to the apparatus body 1A independently from the belt cleaner 12, but as a modified example, as illustrated in FIG. 5, the toner cartridge 31 and the waste toner container 35 of the belt cleaner 12 may be configured as an integrated unit 34. In that case, by replacing the unit 34 when the remaining amount of toner of the toner cartridge 31 becomes small, the toner cartridge 31 and the waste toner container 35 are replaced with new ones. Therefore, compared to the case where the toner cartridge 31 and the waste toner container 35 which are consumables are replaced independently, the number and frequency of replacement can be reduced, and convenience thereof can be improved. As for the area to be integrated with the toner cartridge 31, it is either possible to integrate only the waste toner container 35 with the toner cartridge 31 or to integrate the entire belt cleaner 12 including the cleaning member 12*a* with the toner cartridge 31.

According further to the preset embodiment, the toner cartridge 31 and the process cartridge 30*k* are described as being communicated via the toner conveying pipe 33 provided on the apparatus body 1A. The present invention is not limited to this example, and a configuration can be adopted where the discharge port of the toner cartridge 31 and the replenishing port 32 of the process cartridge 30*k* are directly connected in a state where the toner cartridge 31 is mounted to the apparatus body 1A.

Binding Device

Figure 6:
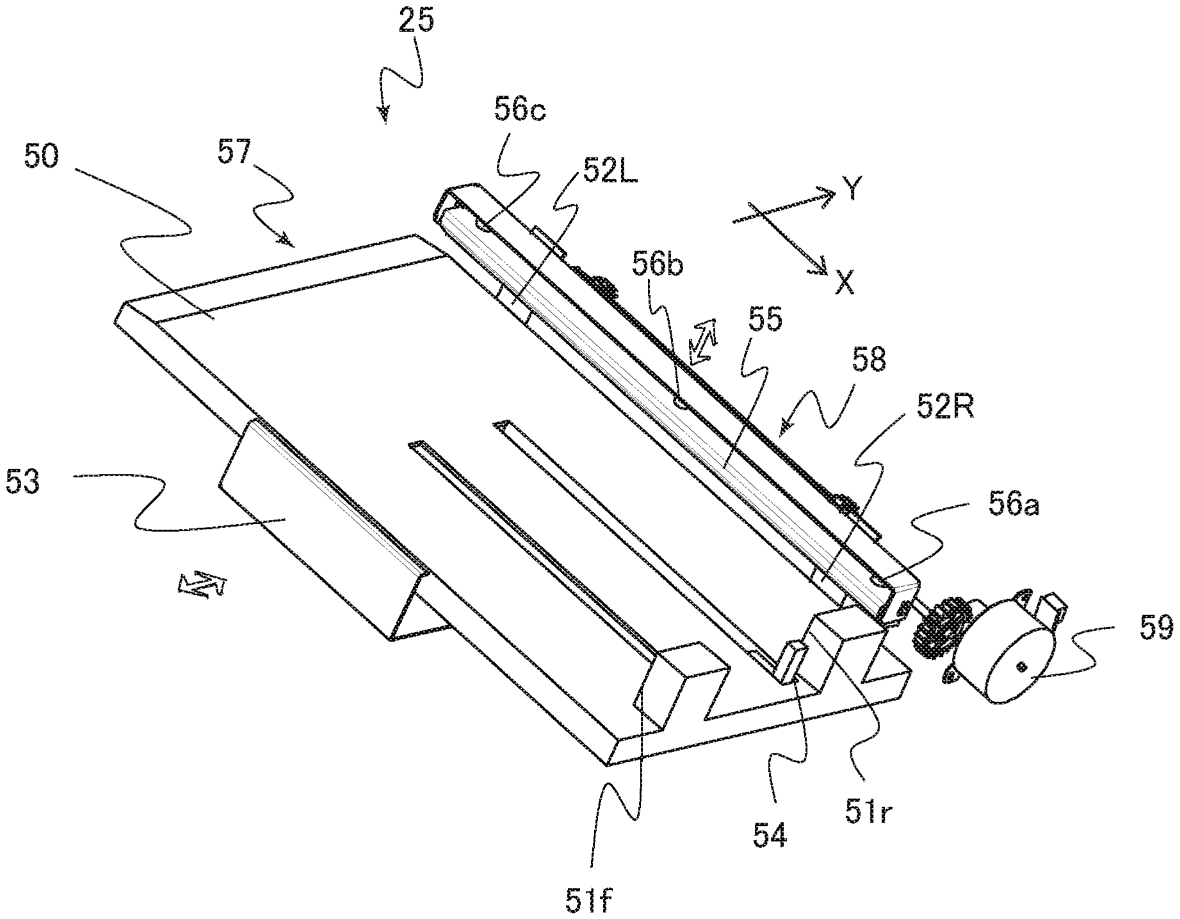
FIG. 6 is a schematic drawing of a binding device according to the first embodiment.

The detailed configuration of the binding device 25 will now be described. FIG. 6 is a perspective view of the binding device 25 according to the present embodiment. The binding device 25 includes an aligning mechanism 57 and a bonding mechanism 58.

The aligning mechanism 57 includes an aligning tray 50, leading-edge alignment units 51*f* and 51*r*, side edge reference panels 52L and 52R, an aligning plate 53, and a bundle discharge guide 54. The aligning tray 50 serves as a supporting portion, i.e., sheet supporting portion, on which a plurality of sheets being the target of binding process, i.e., bonding process, are supported. The sheets being conveyed to the binding device 25 by the conveyance roller pair 47 (FIG. 1) of the postprocessing apparatus 6 are sequentially stacked on the aligning tray 50.

The leading-edge alignment units 51*f* and 51*r* are aligning members, i.e., alignment references, for aligning the position of sheets in a first direction X by having the leading edge of the sheet abut against the members in the conveyance direction of the sheet conveyed by the conveyance roller pair 47. According to the present embodiment, aligning of sheets are performed by the leading-edge alignment units 51*f* and 51*r* using the weight of the sheets supported on the aligning tray 50. Therefore, the aligning tray 50 is arranged in an inclined manner such that the position thereof in the gravity direction is lowered as it becomes closer to the leading-edge alignment units 51*f* and 51*r* in the first direction X (refer to FIG. 1). Note that, alignment of the sheets can also be performed by moving the sheets in the first direction X by a movement member such as a roller member or a knurled belt arranged above the aligning tray 50 until the sheets are abutted against the leading-edge alignment units 51*f* and 51*r*.

The side edge reference panels 52L and 52R are members, i.e., alignment references, which are used as reference of sheet position in a second direction Y orthogonal to the first direction X, and the panels are arranged on one side in the second direction Y of the aligning tray 50. The aligning plate 53 is a member for aligning the sheet position in the second direction Y by moving in the second direction Y. By having the aligning plate 53 move in the second direction Y so as to approach the side edge reference panels 52L and 52R after the sheets have been supported on the aligning tray 50, the side edges of the sheets are abutted against the side edge reference panels 52L and 52R and the position of the sheets are aligned with respect to the second direction Y.

The bundle discharge guide 54 is a pressing member that includes a claw portion protruded upward from a supporting surface of the aligning tray 50, and pushes out the sheet bundle from the aligning tray 50 by moving along the first direction X. After a binding process has been performed to the sheets supported on the aligning tray 50 by the bonding mechanism 58, the bundle discharge guide 54 pushes the sheet bundle via the claw portion and moves the sheets to the discharge direction, which in the present embodiment is a direction opposite to the first direction X, by which the sheet bundle is pushed out. After moving the sheet bundle to a delivery position to the sheet bundle discharge roller pair 48 (FIG. 1), the bundle discharge guide 54 is returned to the position illustrated in FIG. 6.

The bonding mechanism 58 includes a heating apparatus 55 including a heater, a motor 59 lifting and lowering the heating apparatus 55 with respect to the aligning tray 50, and a pressurizing spring 56 configured to urge the heating apparatus 55 toward the aligning tray 50.

Figure 7:
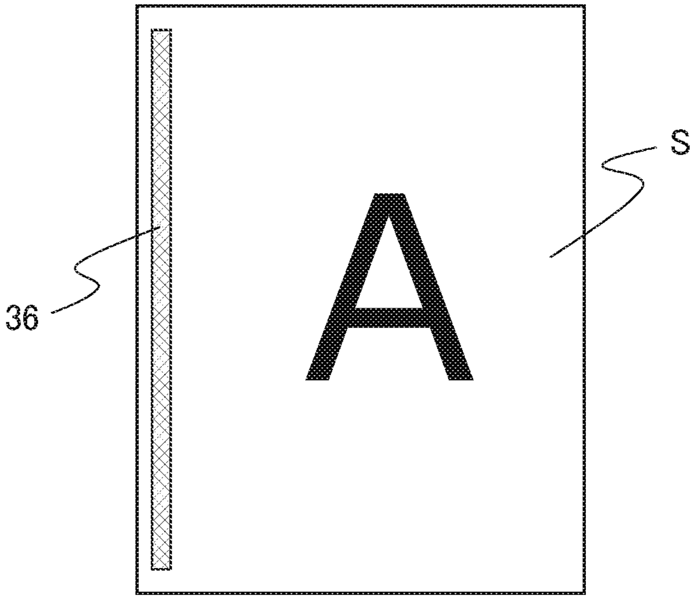
FIG. 7 illustrates a transfer position of powder adhesive on a sheet according to the first embodiment.

The operation of the binding process will be described with reference to FIGS. 7 and 8A to 8D. FIG. 7 is a view illustrating an example of a transfer position of adhesive toner on the sheet. FIG. 8 is a view illustrating the biding process operation by the binding device 25. When performing the binding process to the sheets to which image has been formed with the aim to create a booklet, the sheets S subjected to image forming in the image forming apparatus 1 are delivered to the postprocessing apparatus 6 and conveyed to the binding device 25. In this state, as illustrated in FIG. 7, both the toner image of black toner formed by the process cartridge 30*k* and a toner image 36 of adhesive toner formed by the process cartridge 30*s* are formed on the sheet S.

The binding device 25 according to the present embodiment has a function to bind the long sides of A4 sized sheets S, for example. That is, the sheet S illustrated in FIG. 7 is supported on the aligning tray 50 in a state where a long side to which the toner image 36 of adhesive toner has been formed is positioned at a depth side of FIG. 6. In the present embodiment, in order to further enhance the safety of users coping with jamming, the heating apparatus 55 is arranged on a rear side of the postprocessing apparatus 6 (depth side of FIG. 1). That is, when sheet jamming occurs at the binding device 25, the user opens the door provided on a front side of the postprocessing apparatus 6 to access the binding device 25 from the front side to remove sheets. In this state, since the heating apparatus 55 is arranged on the rear side of the postprocessing apparatus 6, the possibility of a user accidentally touching the heating apparatus 55 is reduced. Note that, it is also possible to arrange the heating apparatus 55 at a front side of the postprocessing apparatus 6 or on the lower right side of FIG. 1 according to the actual configuration of the postprocessing apparatus 6. Further, since the bondable position of the sheets is determined by the arrangement of the heating apparatus 55, the number or combination of the heating apparatus 55 can be varied.

Figure 8A:
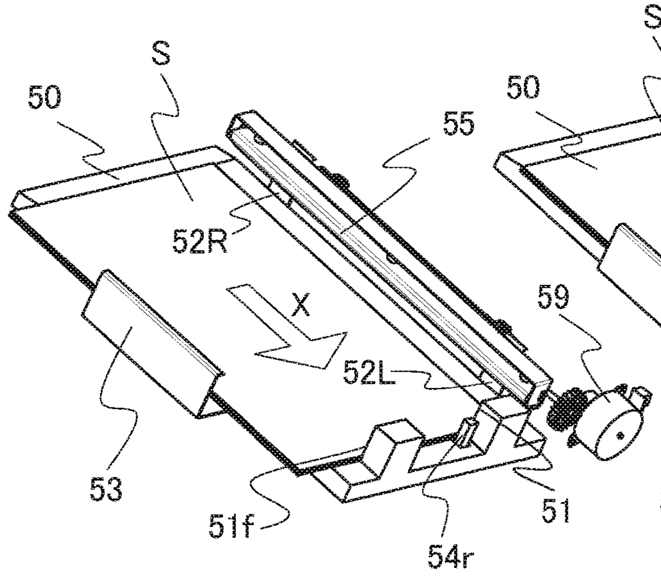
FIGS. 8A to 8D are each an illustration of an operation of the binding device according to the first embodiment.
Figure 8B:
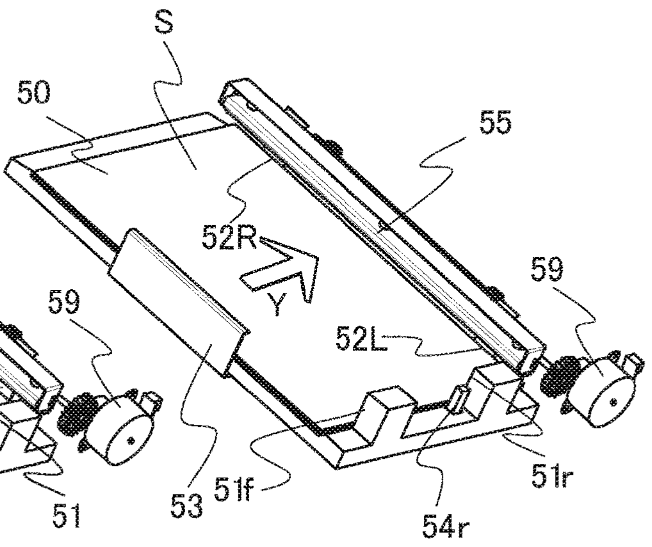

As illustrated in FIG. 8A, when the sheet S is discharged onto the aligning tray 50, the sheet S moves in the first direction X along the inclination of the aligning tray 50 by its own weight and abuts against the leading-edge alignment units 51*f* and 51*r*, by which the sheet position in the first direction X is aligned. Next, as illustrated in FIG. 8B, the aligning plate 53 is driven by a drive unit not shown and moves to the second direction Y, by which the sheet S is abutted against the side edge reference panels 52L and 52R and the sheet position is aligned in the second direction Y.

Figure 8C:
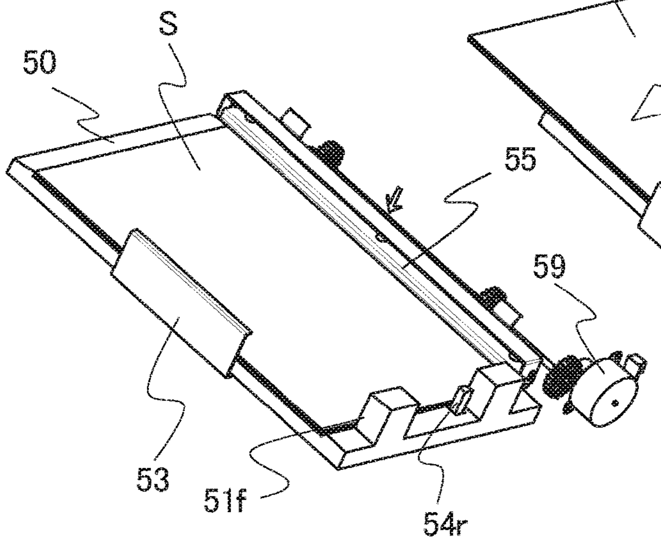

In a state where the plurality of sheets S including the sheets S to which adhesive toner has been transferred are aligned on the aligning tray 50, as illustrated in FIG. 8C, the heater of the heating apparatus 55 is heated and the motor 59 lowers the heating apparatus 55. Thereby, the heating apparatus 55 comes into pressure contact with the sheet bundle by the urging force of the pressurizing spring 56. In this state, the heating apparatus 55 contacts the sheet bundle at a position corresponding to the area to which adhesive toner has been transferred onto the sheet S. By being heated and pressed by the heating apparatus 55, adhesive toner of the sheet S is softened, adhered to a sheet S opposite the sheet S, and solidified, by which the sheets S are mutually bonded via adhesive toner.

Figure 8D:
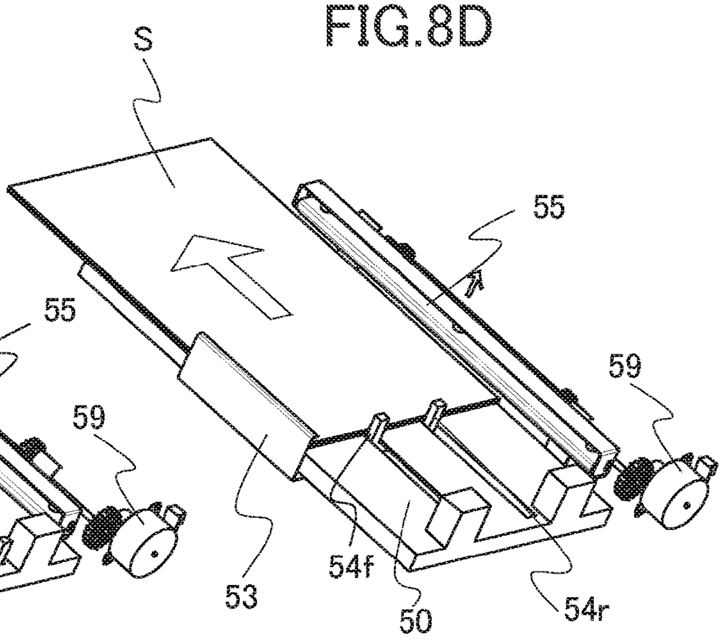

The above-described operation is repeated until a predetermined number of sheets S designated by the job including the request for a binding process has been supported on the aligning tray 50, according to which a sheet bundle in which the predetermined number of sheets S have been mutually bonded by adhesive toner is formed. Thereafter, as illustrated in FIG. 8D, the sheet bundle having been bound by the binding process is conveyed by the bundle discharge guide 54 to the sheet bundle discharge roller pair 48 and discharged onto the lower sheet discharge tray 49.

As described above, according to the present embodiment, a configuration has been illustrated where the process cartridge 30*k* that receives toner replenishment from the toner cartridge 31 and the process cartridge 30*s* that does not receive toner replenishment are arranged along the intermediate transfer belt 8. Thereby, in a configuration using multiple types of toner, both reduction of running costs by the toner cartridge 31 and convenience of integrated-type process cartridge can be realized.

Figure 9:
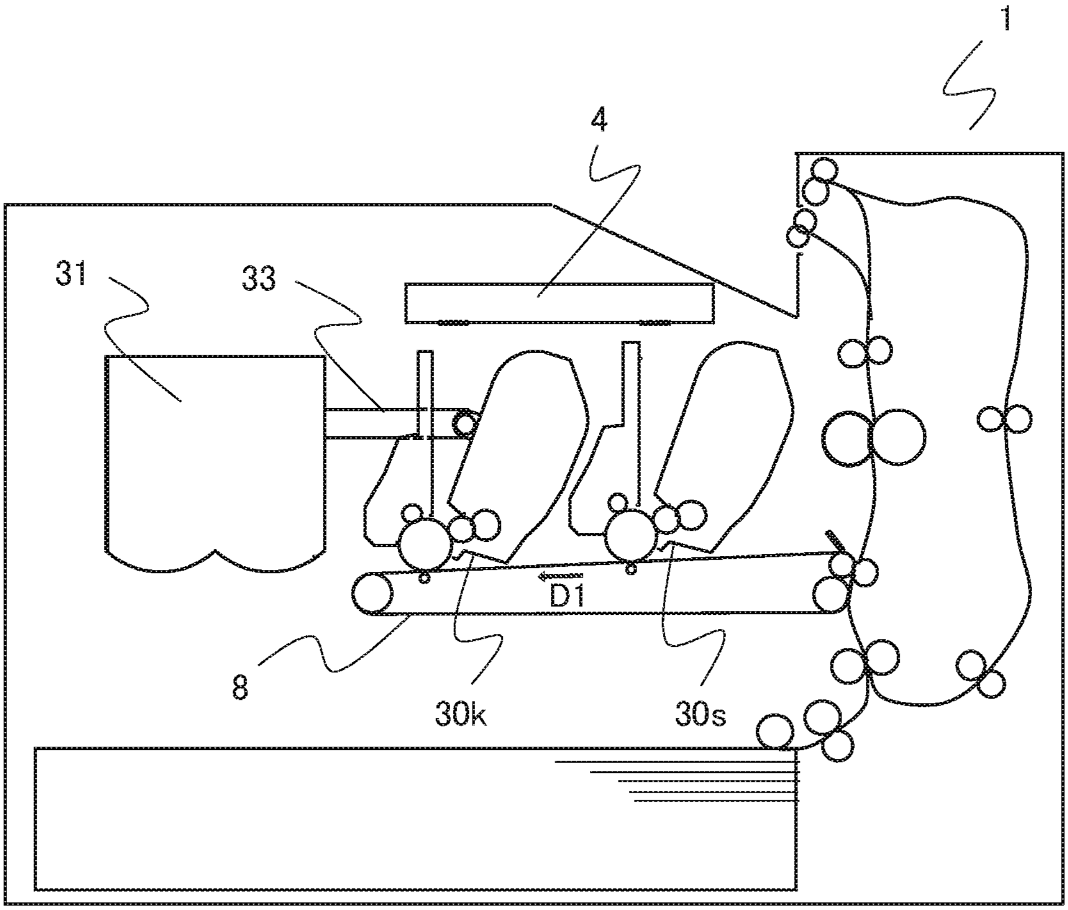
FIG. 9 is a schematic drawing illustrating a modified example of an apparatus body configuration according to the first embodiment.

According to the present embodiment, the process cartridges 30*s* and 30*k* and the toner cartridge 31 are arranged below the intermediate transfer belt 8, but as illustrated in FIG. 9, it is also possible to arrange these cartridges above the intermediate transfer belt 8. Also according to this case, the process cartridges 30*s* and 30*k* are arranged approximately in parallel with the conveyance direction D1 of the intermediate transfer belt 8 in an opposite direction as the present embodiment. The process cartridge 30*k* is preferably arranged downstream of the process cartridge 30*s* in the conveyance direction D1. Further, the toner cartridge 31 is arranged side by side with the process cartridges 30*s* and 30*k* in the conveyance direction D1, and preferably arranged downstream of the process cartridges 30*s* and 30*k* in the conveyance direction D1.

The direction in which the intermediate transfer belt 8 is stretched is not limited to the horizontal direction, and it can be a direction obliquely intersecting the horizontal direction or in an approximately vertical direction when viewed in the main scanning direction of image forming. Therefore, the conveyance direction D1 of the intermediate transfer belt 8 is not limited to the direction illustrated in FIGS. 1 and 9. Further, for example, it is possible to arrange the process cartridges 30*s* and 30*k* on one side below or above the intermediate transfer belt 8 and to arrange the toner cartridge 31 on the other side of the intermediate transfer belt 8.

Second Embodiment

Next, an image forming apparatus according to a second embodiment will be described. The image forming apparatus according to the present embodiment adopts a configuration where the image forming apparatus 1 including four process cartridges is partially varied. Further, the image forming apparatus according to the present embodiment can be combined with the postprocessing apparatus 6 to configure an image forming system 1S, similar to the image forming apparatus 1 according to the first embodiment. Hereafter, elements denoted with the same reference numbers as the first embodiment are assumed as having substantially the same structures and functions as the first embodiment.

Figure 10A:
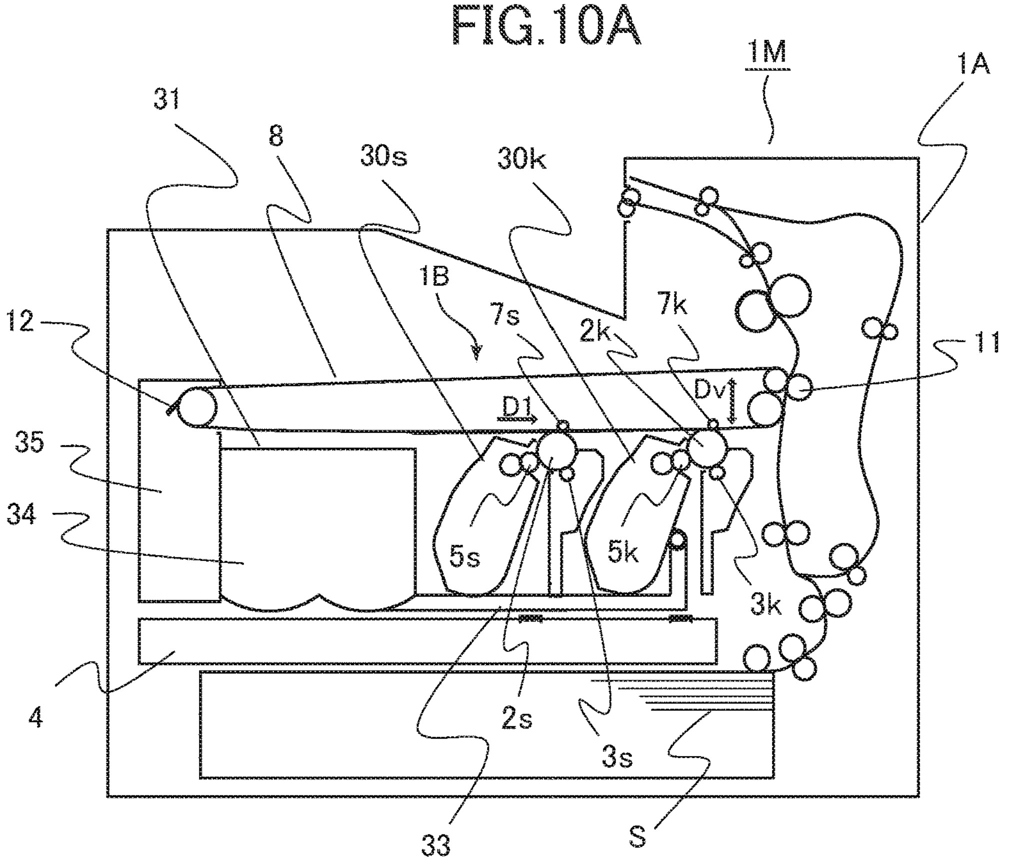
FIG. 10A is a schematic drawing of an image forming apparatus according to a second embodiment.

FIG. 10A is a schematic drawing illustrating a configuration where the image forming apparatus according to the present embodiment is formed as a monochrome image forming apparatus 1M having a function to transfer, or apply, adhesive toner to a sheet. Similar to the image forming apparatus 1 of the first embodiment, the monochrome image forming apparatus 1M includes a process cartridge 30*k* that receives replenishment of toner from a toner cartridge 31 and an integrated-type, or independent-type, process cartridge 30*s* that does not receive replenishment of toner. The process cartridges 30*s* and 30*k* are arranged along the intermediate transfer belt 8, wherein the toner cartridge 31 and the process cartridges 30*s* and 30*k* are arranged in this order along the conveyance direction D1 of the intermediate transfer belt 8. The process cartridge 30*k* uses black toner to form a toner image, and the process cartridge 30*s* uses adhesive toner to form a toner image to be transferred to an adhesion position of the sheet.

Figure 10B:
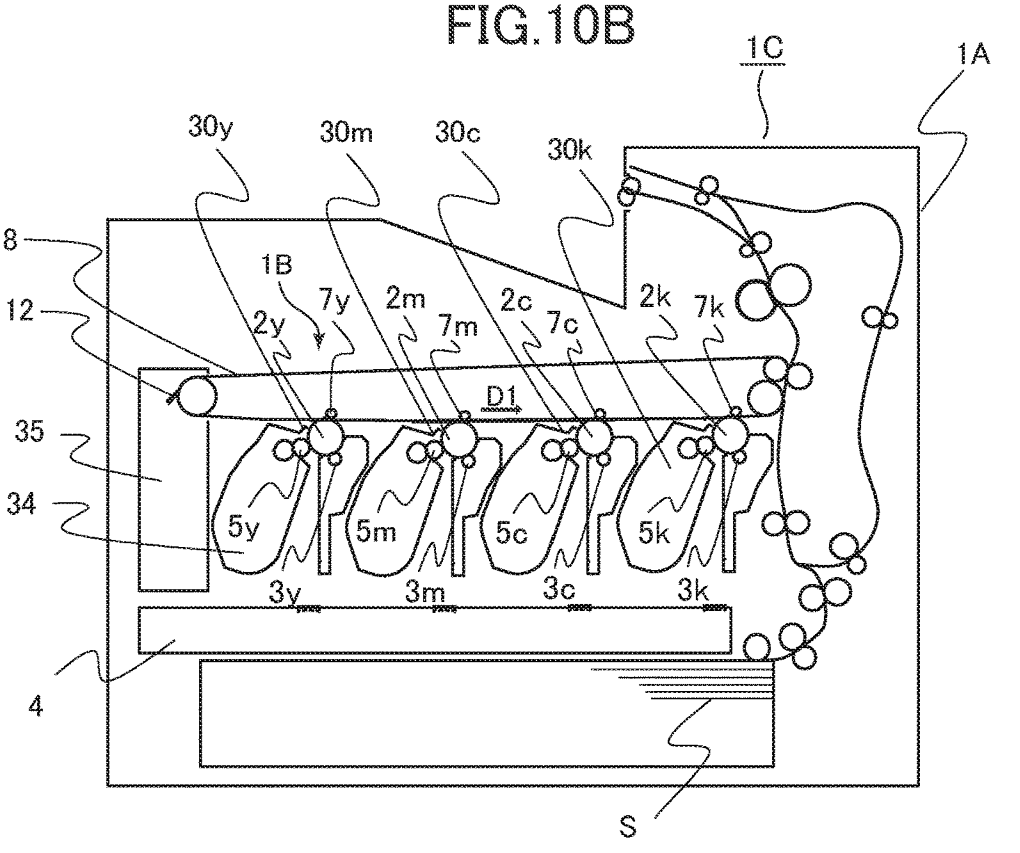
FIG. 10B is a schematic drawing of an image forming apparatus according to a comparative example.

FIG. 10B is a schematic drawing of a color image forming apparatus 1C that serves as a comparative example including the apparatus body 1A having a basic configuration similar to the present embodiment and capable of forming a full-color image using toner of four colors. Instead of being equipped with the toner cartridge 31 and the process cartridge 30*s*, the color image forming apparatus 1C includes process cartridges 30*y*, 30*m*, and 30*c* for forming toner images of colored toner of yellow, magenta, and cyan. The four process cartridges 30*y*, 30*m*, 30*c*, and 30*k* are arranged on the lower side of the intermediate transfer belt 8, and they are arranged in this order along the conveyance direction D1 of the intermediate transfer belt 8.

The configurations of the monochrome image forming apparatus 1M and the color image forming apparatus 1C excluding the portions of the process cartridges 30*s*, 30*k*, 30*y*, 30*m*, and 30*c* and the toner cartridge 31 are basically the same. For example, the same intermediate transfer belt 8 and the scanner unit 4 can be used in both the monochrome image forming apparatus 1M and the color image forming apparatus 1C.

Note that, among the elements composing the color image forming apparatus 1C, the elements for the process cartridges 30*y* and 30*m* that do not exist in the monochrome image forming apparatus 1M do not have to be provided in the monochrome image forming apparatus 1M. For example, the primary transfer rollers 7*y* and 7*m* (FIG. 10B) corresponding to the process cartridges 30*y* and 30*m* and a polygon motor inside the scanner unit 4 can be omitted. Further, a drive motor for driving the photosensitive drums 2*y* and 2*m* of the process cartridges 30*y* and 30*m* or a high-pressure substrate for applying voltage to the charging devices 3*y* and 3*m* of the process cartridges 30*y* and 30*m* or the developing units 5*y* and 5*m* can be omitted.

As illustrated in FIGS. 10A and 10B, the toner cartridge 31 is mounted to the monochrome image forming apparatus 1M utilizing at least a portion of the space in which the process cartridges 30*y*, 30*m*, and 30*c* have been mounted in the color image forming apparatus 1C. Therefore, when viewed in a gravity direction, or vertical direction, the toner cartridge 31 is at least partially overlapped with the intermediate transfer belt 8 and the scanner unit 4. Further, the process cartridge 30*s* using adhesive toner is mounted to the monochrome image forming apparatus 1M utilizing at least a portion of the space in which the process cartridges 30*y*, 30*m*, and 30*c* for forming a color image have been mounted in the color image forming apparatus 1C.

In order to mount the toner cartridge 31 in the above-mentioned mounting space, according to the present embodiment, the toner cartridge 31 and the process cartridges 30*s* and 30*k* are arranged side by side along the intermediate transfer belt 8. That is, as illustrated in FIG. 10A, the toner cartridge 31 is mounted at a position overlapped with the process cartridges 30*s* and 30*k* when viewed in the conveyance direction D1 of the intermediate transfer belt 8 in the area between the tension roller 10 and the photosensitive drum 2*s*. Further, the conveyance direction D1 is approximately the same direction as the conveyance direction D1 of the intermediate transfer belt 8 in the area between the tension roller 10 and the stretching roller 9*b*. In other words, the toner cartridge according to the present embodiment is mounted to a position overlapped with the first process cartridge and the second process cartridge when viewed in a moving direction (D1) of the belt in the area between the tension roller and the first image bearing member.

In the positional relationship with the scanner unit 4, the toner cartridge 31 is mounted between the scanner unit 4 and the intermediate transfer belt 8 in an orthogonal direction Dv of the intermediate transfer belt 8. Further, when viewed in the orthogonal direction Dv, the toner cartridge 31 is at least partially overlapped with the intermediate transfer belt 8 and the scanner unit 4. The orthogonal direction Dv is a direction orthogonal to the conveyance direction D1 of the intermediate transfer belt 8, specifically, a direction orthogonal to the conveyance direction D1 at a contact position with the photosensitive drum 2*k*, when viewed in the main scanning direction of image formation, that is, rotational axis direction of the photosensitive drum 2*k*. In the drawing, the intermediate transfer belt 8 is stretched approximately horizontally and the orthogonal direction Dv is approximately parallel to the vertical direction, but in accordance with the stretching direction of the intermediate transfer belt 8, the orthogonal direction Dv can be inclined with respect to the vertical direction.

That is, according to the present embodiment, when viewed in a rotational axis direction of the first image bearing member, that is, the photosensitive drum 2*k*, the exposure unit is arranged such that the first process cartridge and the second process cartridge are interposed between the belt and the exposure unit in an orthogonal direction (Dv) orthogonal to the moving direction (D1) of the belt at a contact portion with the first image bearing member. According to the present embodiment, when viewed in the rotational axis direction of the first image bearing member, the toner cartridge is arranged on the same side as the first process cartridge and the second process cartridge with respect to the belt in the orthogonal direction (Dv), and on the same side as the first process cartridge and the second process cartridge with respect to the exposure unit in the orthogonal direction (Dv). According to this arrangement, a configuration of the monochrome image forming apparatus 1M that utilizes the same apparatus body as the color image forming apparatus 1C can be realized.

Further, a configuration can also be adopted where the scanner unit 4 or the intermediate transfer belt 8 is formed shorter in the conveyance direction D1 than that illustrated in FIG. 10A. Moreover, if an LED exposure unit is used as the exposure unit, for example, there is no need to arrange the toner cartridge 31 between the exposure unit and the intermediate transfer belt 8 in the orthogonal direction Dv. Even in that case, the advantages equivalent to the present embodiment can be achieved if the toner cartridge 31 is arranged along the intermediate transfer belt 8 to be overlapped with the process cartridges 30*s* and 30*k* when viewed in the conveyance direction D1.

As described, the monochrome image forming apparatus 1M can be designed to correspond to the application of use by the user, and the space in which the process cartridges 30*y*, 30*m*, and 30*c* have been mounted in the color image forming apparatus 1C can be utilized efficiently to mount the toner cartridge 31 having a large capacity. Thus, running costs of the image forming apparatus can be cut down. Moreover, by combining the monochrome image forming apparatus with an integrated-type process cartridge 30*s* using special toner such as adhesive toner, a variety of functions can be realized by the apparatus. Especially by using adhesive toner in the integrated-type process cartridge 30*s*, the binding process of the sheet can be performed by the binding device 25 similar to that in the first embodiment.

Modified Example

Figure 11A:
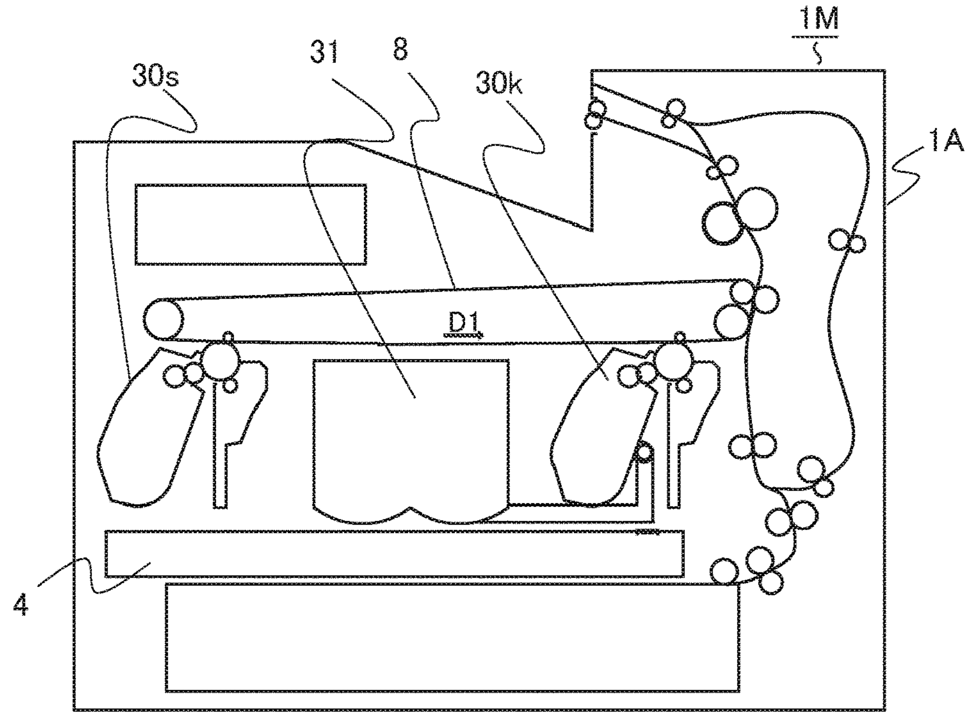
FIGS. 11A and 11B are each a schematic view illustrating a modified example of cartridge arrangement according to the second embodiment.
Figure 11B:
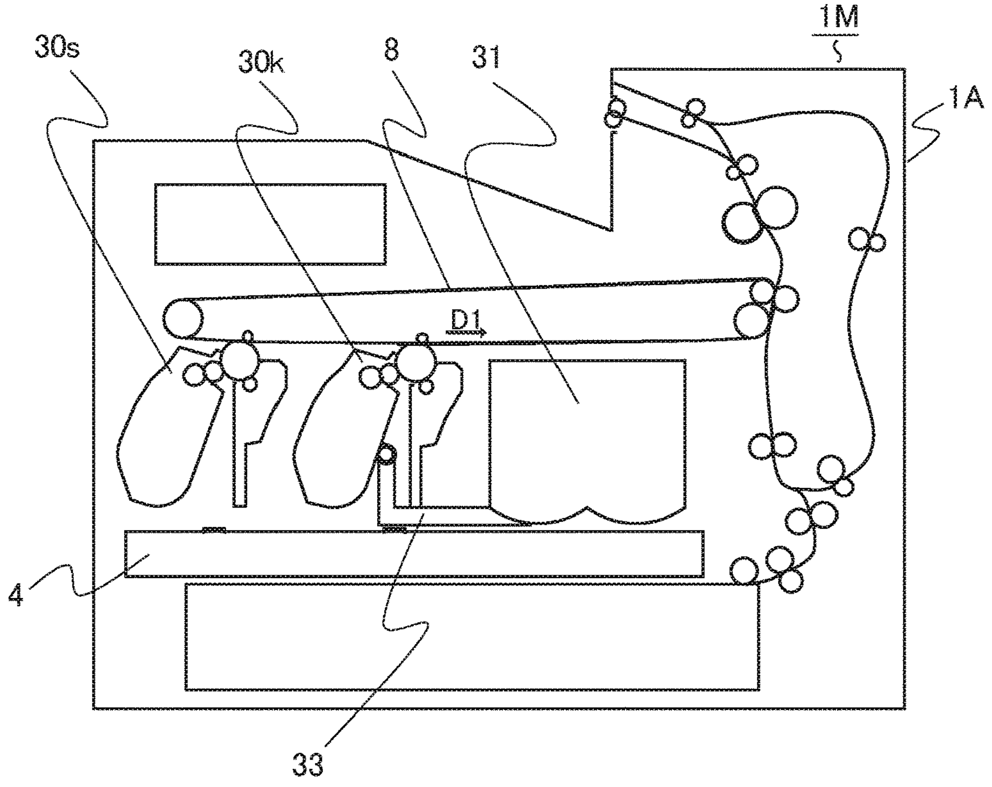

In the present embodiment, the arrangement of cartridges in the monochrome image forming apparatus 1M can be varied arbitrarily. For example, as illustrated in FIG. 11A, the toner cartridge 31 can be mounted between the process cartridges 30*s* and 30*k* in the conveyance direction D1 of the intermediate transfer belt 8. The above-mentioned modified example is an example of a configuration where the second process cartridge, the toner cartridge, the first process cartridge, and the transfer portion are arranged in this order in the moving direction of the intermediate transfer belt 8. Further, as illustrated in FIG. 11B, the toner cartridge 31 can be mounted downstream of the process cartridges 30*s* and 30*k* in the conveyance direction D1 of the intermediate transfer belt 8. The above-mentioned modified example is an example of a configuration where the second process cartridge, the first process cartridge, the toner cartridge, and the transfer portion are arranged in this order in the moving direction of the intermediate transfer belt 8. Moreover, a configuration can also be adopted where the first process cartridge, the second process cartridge, and the transfer portion are arranged in this order, including the configuration where the toner cartridge, the first process cartridge, the second process cartridge, and the transfer portion are arranged in this order, in the moving direction of the intermediate transfer belt 8.

Further according to the monochrome image forming apparatus 1M of the present embodiment, the three process cartridges 30*y*, 30*m*, and 30*c* in the color image forming apparatus 1C are replaced with one process cartridge 30*s* and one toner cartridge 31. However, it is also possible to adopt a configuration where one process cartridge in the color image forming apparatus 1C is replaced with the toner cartridge 31, and toner is replenished to any one of the process cartridges from the toner cartridge 31. For example, a configuration can be adopted where the process cartridge 30*k* using black toner, two process cartridges using two other colored toner or transparent toner, and the toner cartridge 31 for replenishing black toner to the process cartridge 30*k* are provided.

Third Embodiment

Figure 12:
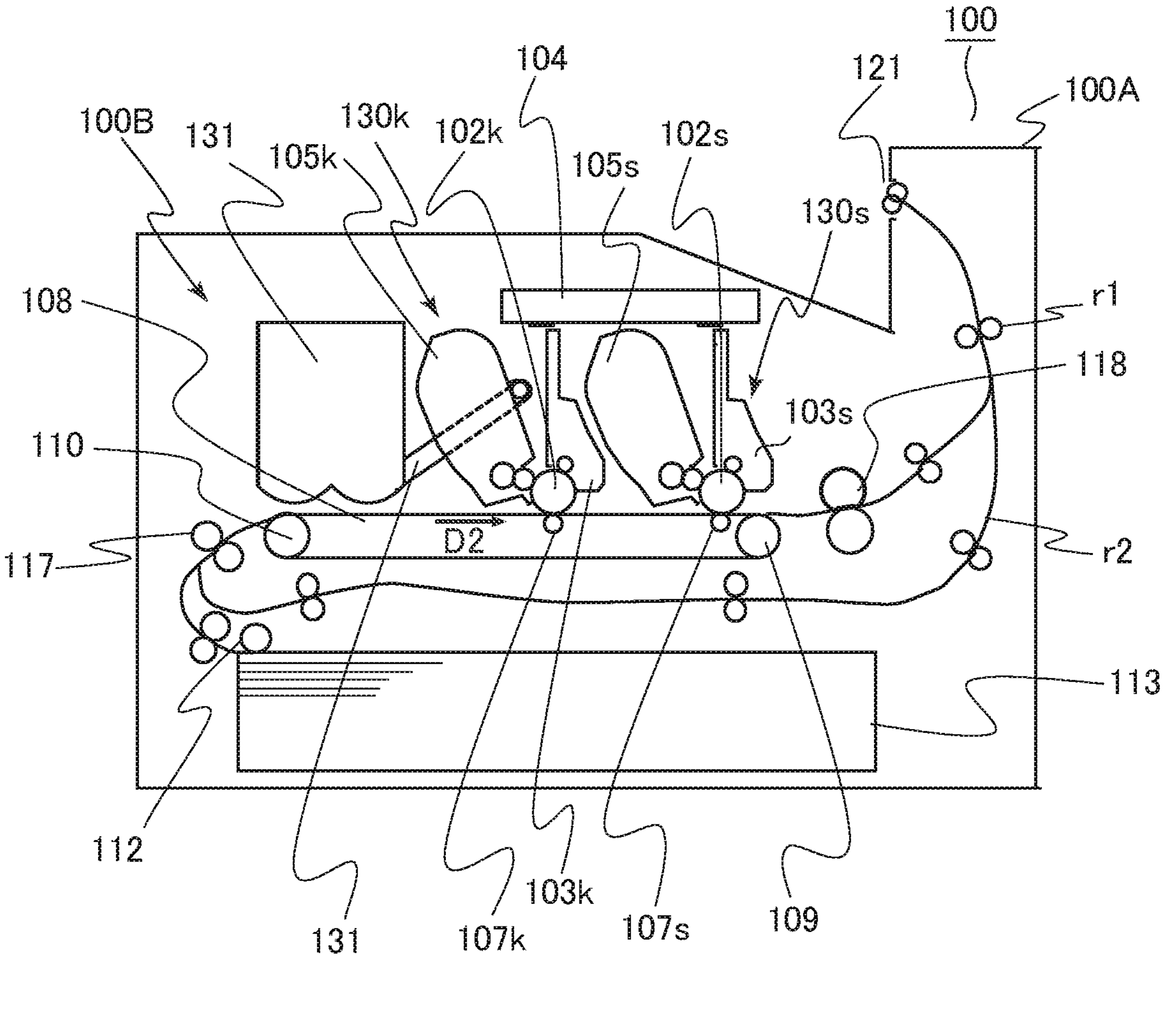
FIG. 12 is a schematic drawing of an image forming apparatus according to a third embodiment.

Next, an image forming apparatus 100 according to a third embodiment will be described. FIG. 12 is a schematic drawing of an image forming apparatus 100 according to the present embodiment. The present embodiment adopts a direct transfer system in which toner image is transferred from an image bearing member, i.e., electrophotographic photosensitive member, directly to a recording material without interposing an intermediate transfer body.

As illustrated in FIG. 12, the image forming apparatus 100 includes an image forming unit 100B that includes process cartridges 130*k* and 130*s* that are arranged along an electrostatic attraction belt 108, and a toner cartridge 131. The process cartridge 130*k* serving as a first process cartridge, the process cartridge 130*s* serving as a second process cartridge, and the toner cartridge 131 are all detachably attached independently to an apparatus body 100A of the image forming apparatus 100.

The process cartridges 130*k* and 130*s* include photosensitive drums 102*k* and 102*s* serving as image bearing members, charging devices 103*k* and 103*s*, and developing units 105*k* and 105*s* each including a developing roller and a toner container. Black toner is accommodated in the developing unit 105*k* of the process cartridge 130*k*, and adhesive toner is accommodated in the developing unit 105*s* of the process cartridge 130*s*. Black toner to be replenished to the process cartridge 130*k* is accommodated in the toner cartridge 131, and a discharge port of the toner cartridge 131 is connected to a replenishing port of the process cartridge 130*k* via a toner conveying pipe 133. A scanner unit 104 is arranged above the process cartridges 130*k* and 130*s*.

The process cartridge 130*k* serves as a first process cartridge, i.e., first cartridge, according to the present embodiment, a photosensitive drum 102*k* serves as a first image bearing member according to the present embodiment, and a developing roller of the developing unit 105*k* serves as a first developing roller according to the present embodiment. The process cartridge 130*s* serves as a second process cartridge, i.e., second cartridge, according to the present embodiment, a photosensitive drum 102*s* serves as a second image bearing member according to the present embodiment, and the developing roller of the developing unit 105*s* serves as a second developing roller according to the present embodiment.

The electrostatic attraction belt 108 is an endless conveyor belt that conveys the sheet S via the transfer portion at which transfer of toner image is performed. The electrostatic attraction belt 108 is stretched across a driving roller 109 and a stretching roller 110 and driven in a clockwise direction in the drawing by the rotation of the driving roller 109. Hereafter, a direction in which the electrostatic attraction belt 108 is conveyed from the stretching roller 110 serving as a first roller toward the driving roller 109 serving as a second roller, that is, a direction in which a surface of the electrostatic attraction belt 108 in contact with the sheet S moves, is referred to as a conveyance direction D2 of the electrostatic attraction belt 108. A fixing unit 118 of a heat fixing system is arranged downstream of the electrostatic attraction belt 108 in the conveyance direction D2.

The photosensitive drums 102*k* and 102*s* of the respective process cartridges 130*k* and 130*s* are abutted against an upper surface of the electrostatic attraction belt 108. Transfer rollers 107*k* and 107*s* serving as transfer members are arranged at positions opposing the photosensitive drums 102 and 102*s* on the inner side of the electrostatic attraction belt 108. Transfer portions at which toner images are transferred are formed as nip portions between the transfer rollers 107*k* and 107*s* and the photosensitive drums 102*k* and 102*s*. A sheet feeding unit including a cassette 113 serving as a supporting portion and a feed roller 114 serving as a feeding member is provided below the electrostatic attraction belt 108.

Cartridge Arrangement

Now, the arrangement of the process cartridges 130*k* and 130*s* and the toner cartridge 131 will be described. In the present embodiment, the toner cartridge 131, the process cartridge 130*k*, and the process cartridge 130*s* are arranged in this order from upstream toward downstream in the conveyance direction D2 approximately parallel to the conveyance direction D2 of the electrostatic attraction belt 108. When viewed in the conveyance direction D1 of the intermediate transfer belt 8, occupation areas of the two process cartridges 130*s* and 130*k* are at least partially overlapped, and preferably approximately coincide. When viewed in the conveyance direction D1 of the intermediate transfer belt 8, at least a portion of the toner cartridge 131 overlaps with the process cartridges 130*s* and 130*k*.

Unlike the first embodiment, the process cartridge 130*k* using black toner is arranged upstream in the conveyance direction D2 of the process cartridge 130*s* using adhesive toner. This is because in the configuration for the direct transfer system, the toner image transferred further downstream in the conveyance direction D2 is positioned on the upper surface on the sheet S, so that it is advantageous from the viewpoint of adhesive property during binding process to place the process cartridge 130*s* using adhesive toner downstream. Further, since the process cartridge 130*k* using black toner is arranged adjacent the toner cartridge 131, the length of the toner conveying pipe 133 can be shortened.

Image Forming Operation

When the image forming apparatus 1 executes an image forming operation, the sheets S are fed from the cassette 113 via the feed roller 114, and the sheets are separated one by one via a separation roller pair 115 and conveyed. The sheet S is subjected to skew correction and timing adjustment by a registration roller pair 117 and delivered to the electrostatic attraction belt 108.

Meanwhile, in the image forming unit 100B, the photosensitive drums 102*k* and 102*s* are rotated and charging devices 103*k* and 103*s* charge the surface of the photosensitive drums 102*k* and 102*s* uniformly. The scanner unit 104 irradiates laser light to the photosensitive drums 102*k* and 102*s* and forms an electrostatic latent image thereon. The electrostatic latent image is developed using black toner or adhesive toner by the developing units 105*k* and 105*s*, by which a toner image is formed on the photosensitive drums 102*k* and 102*s*.

The toner image formed on the photosensitive drums 102*k* and 102*s* is transferred to the sheet S conveyed on the electrostatic attraction belt 108 by the transfer rollers 107*k* and 107*s*. The sheet S having passed through the transfer portion is sent to the fixing unit 118, and the image is fixed to the sheet S by having the toner on the sheet S heated and pressed. The sheet S having passed through the fixing unit 118 is discharged from the apparatus body 1A by a sheet discharge roller pair 121. In the case of duplex printing, the sheet S is sent to the duplex conveyance path r2 through reverse conveyance of the reverse conveyance roller pair r1, and after having an image formed on a second side thereof, the sheet S is discharged from the apparatus body 1A by the sheet discharge roller pair 121.

Similar to the first embodiment, the image forming apparatus 100 according to the present embodiment can also be used in combination with the postprocessing apparatus 6 (FIG. 1) for performing a binding process of the sheet S. In that case, the sheet S discharged from the sheet discharge roller pair 121 is delivered to the postprocessing apparatus 6, and temporarily supported on the binding device 25 in the postprocessing apparatus 6 to receive a binding process before being discharged as a sheet bundle onto the sheet discharge tray of the postprocessing apparatus 6.

As described above, according to the present embodiment, a configuration has been illustrated where the process cartridge 130*k* that receives replenishment of toner from the toner cartridge 131 and the process cartridge 130*s* that does not receive replenishment of toner are arranged along the electrostatic attraction belt 108. Thereby, in a configuration using multiple types of toner, both reduction of running costs by the toner cartridge 131 and convenience of the integrated-type process cartridge 130*s* can be realized. Further, by using adhesive toner in the integrated-type process cartridge 130*s*, binding process of sheets by the binding device 25 can be carried out similarly as the first embodiment.

Fourth Embodiment

Next, an image forming apparatus according to a fourth embodiment will be described. Hereafter, elements denoted with the same reference numbers as the first embodiment are assumed as having approximately the same configurations and functions as the first embodiment.

Figure 13A:
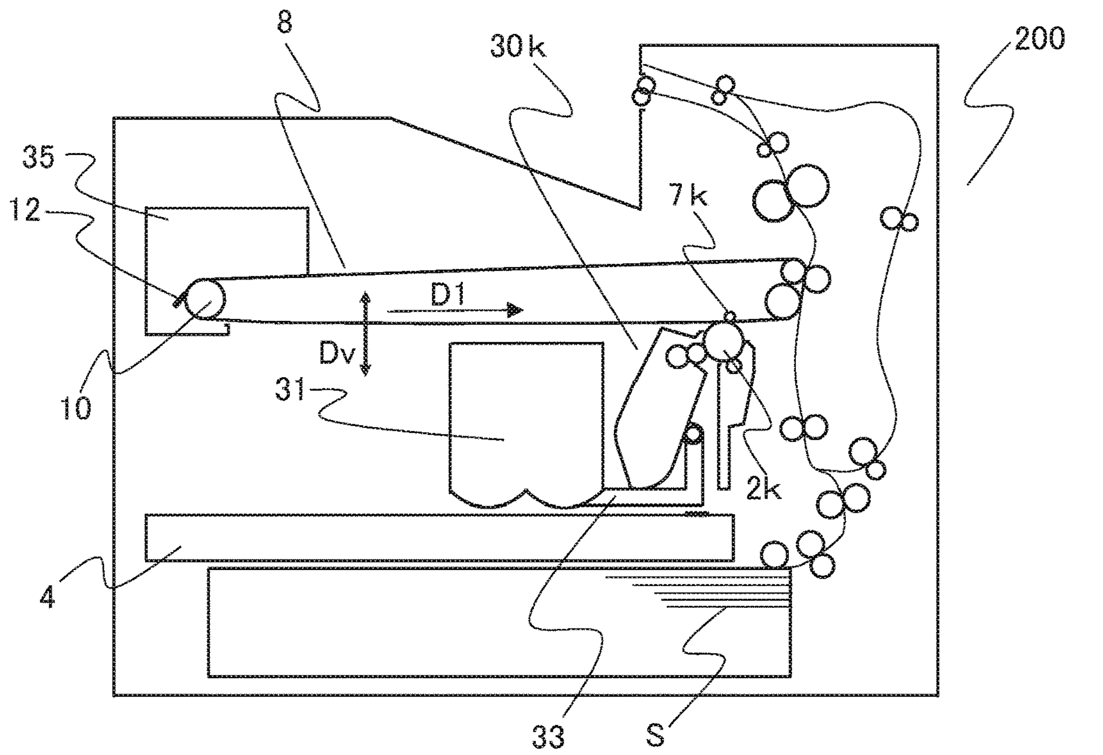
FIGS. 13A and 13B are each a schematic drawing of an image forming apparatus according to a fourth embodiment.

FIG. 13A is a schematic drawing of a case where the image forming apparatus according to the present embodiment is configured as a monochrome image forming apparatus 200. The monochrome image forming apparatus 200 includes the process cartridge 30*k* that receives replenishment of toner from the toner cartridge 31. The process cartridge 30*k* is arranged along the intermediate transfer belt 8, and the toner cartridge 31 and the process cartridge 30*k* are arranged in this order along the conveyance direction D1 of the intermediate transfer belt 8. The process cartridge 30*k* uses black toner to form a toner image. In other words, the monochrome image forming apparatus 200 forms a black monochrome image on the sheet S by the image forming unit including the process cartridge 30*k*.

Similar to the second embodiment, the image forming apparatus according to the present embodiment can be configured as a color image forming apparatus by replacing process cartridges. That is, the configuration of the portion excluding the process cartridges 30*k*, 30*y*, 30*m*, and 30*c* and the toner cartridge 31 are basically the same between the monochrome image forming apparatus 200 according to the present embodiment and the color image forming apparatus 1C (FIG. 10B). Further, among the elements composing the color image forming apparatus 1C (FIG. 10B), there is no need to provide components for the process cartridges 30*c*, 30*y*, and 30*m* that are not included in the monochrome image forming apparatus 200 to the monochrome image forming apparatus 200. For example, the primary transfer rollers 7*c*, 7*y*, and 7*m* corresponding to the process cartridges 30*c*, 30*y*, and 30*m* (FIG. 10B) or a polygon motor arranged in the scanner unit 4 can be omitted. Further, a drive motor for driving the photosensitive drums 2*c*, 2*y*, and 2*m* of the process cartridges 30*c*, 30*y*, and 30*m* or a high-pressure substrate for applying voltage to the charging devices 3*c*, 3*y*, and 3*m* or the developing units 5*c*, 5*y*, and 5*m* of the process cartridges 30*c*, 30*y*, and 30*m* can be omitted.

Similar to the second embodiment, according to the present embodiment, the toner cartridge 31 and the process cartridge 30*k* are arranged side by side along the intermediate transfer belt 8. That is, as illustrated in FIG. 13A, when viewed in the conveyance direction D1 of the intermediate transfer belt 8 in the area between the tension roller 10 and the photosensitive drum 2*k*, the toner cartridge 31 is mounted at a position overlapped with the process cartridge 30*k*. In other words, according to the present embodiment, the toner cartridge is mounted at a position overlapped with the process cartridge when viewed in the moving direction (D1) of the belt in the area between the tension roller stretching the belt and the image bearing member.

In the positional relationship with the scanner unit 4, the toner cartridge 31 is mounted between the scanner unit 4 and the intermediate transfer belt 8 in the orthogonal direction Dv of the intermediate transfer belt 8. The orthogonal direction Dv is a direction orthogonal to the conveyance direction D1 of the intermediate transfer belt 8, specifically, the direction orthogonal to the conveyance direction D1 at a contact position with the photosensitive drum 2*k*, when viewed in the main scanning direction for image forming, that is, the rotational axis direction of the photosensitive drum 2*k*.

That is, according to the present embodiment, the exposure unit is arranged such that the process cartridge is interposed between the belt and the exposure unit in the orthogonal direction (Dv) orthogonal to the moving direction (D1) of the belt at the contact portion with the image bearing member when viewed in the rotational axis direction of the image bearing member, i.e., the photosensitive drum 2*k*. Further according to the present embodiment, the toner cartridge is arranged on a same side as the process cartridge with respect to the belt in the orthogonal direction (Dv), and on a same side as the process cartridge with respect to the exposure unit in the orthogonal direction (Dv), when viewed in the rotational axis direction of the image bearing member. According to this configuration, the configuration of the monochrome image forming apparatus using the same apparatus body as a color image forming apparatus can be realized.

If an LED exposure unit is used as the exposure unit, for example, there is no need to arrange the toner cartridge 31 between the exposure unit and the intermediate transfer belt 8 in the orthogonal direction Dv. Even in that case, the advantages equivalent to the present embodiment can be achieved if the toner cartridge 31 is arranged along the intermediate transfer belt 8 to be overlapped with the process cartridge 30*k* when viewed in the conveyance direction D1.

Figure 14:
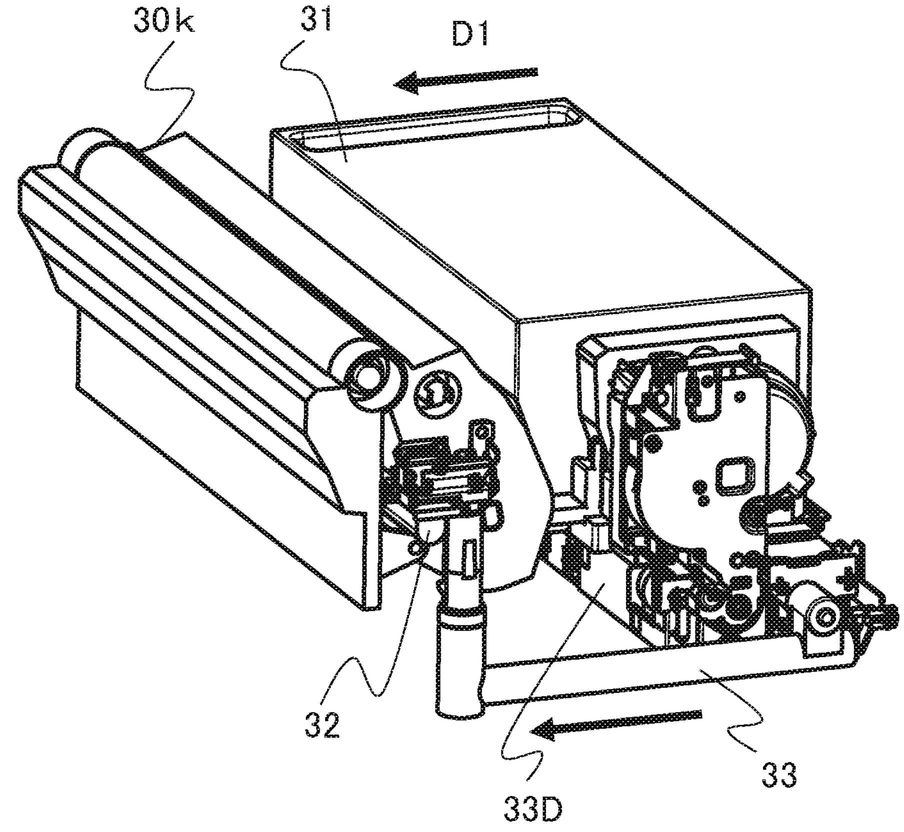
FIG. 14 is a view illustrating a toner replenishing path according to the fourth embodiment.

Next, the toner replenishing configuration of the process cartridge 30*k* will be described with reference to FIGS. 3 and 14. FIG. 14 is a view illustrating a toner replenishing path. FIGS. 3 and 14 are both illustrations of a view from a rear side of the image forming apparatus (depth side of FIG. 1).

As illustrated in FIG. 3, similar to the first embodiment, the replenishing port 32 is provided on the rear side of the process cartridge 30*k*. The replenishing port 32 is communicated with a space within the developing unit 5*k* of the process cartridge 30*k*. As illustrated in FIG. 14, the replenishing port 32 is communicated with the discharge port of the toner cartridge 31 via the toner conveying pipe 33 provided on the apparatus body. A screw not shown is provided inside the toner conveying pipe 33. Then, by having the screw driven by the drive unit 33D, toner is conveyed from the toner cartridge 31 to the process cartridge 30*k*, and toner is replenished to the process cartridge 30*k* in a manner similar to the first embodiment.

As illustrated in FIG. 13A, the toner cartridge 31 is mounted utilizing at least a portion of the space in which the process cartridges 30*y*, 30*m*, and 30*c* have been mounted in the color image forming apparatus 1C (FIG. 10B). Therefore, when viewed in the gravity direction, i.e., vertical direction, the toner cartridge 31 is at least partially overlapped with the intermediate transfer belt 8. Further, when viewed in the orthogonal direction Dv of the intermediate transfer belt 8, the toner cartridge 31 is at least partially overlapped with the intermediate transfer belt 8 and the scanner unit 4.

Figure 13B:
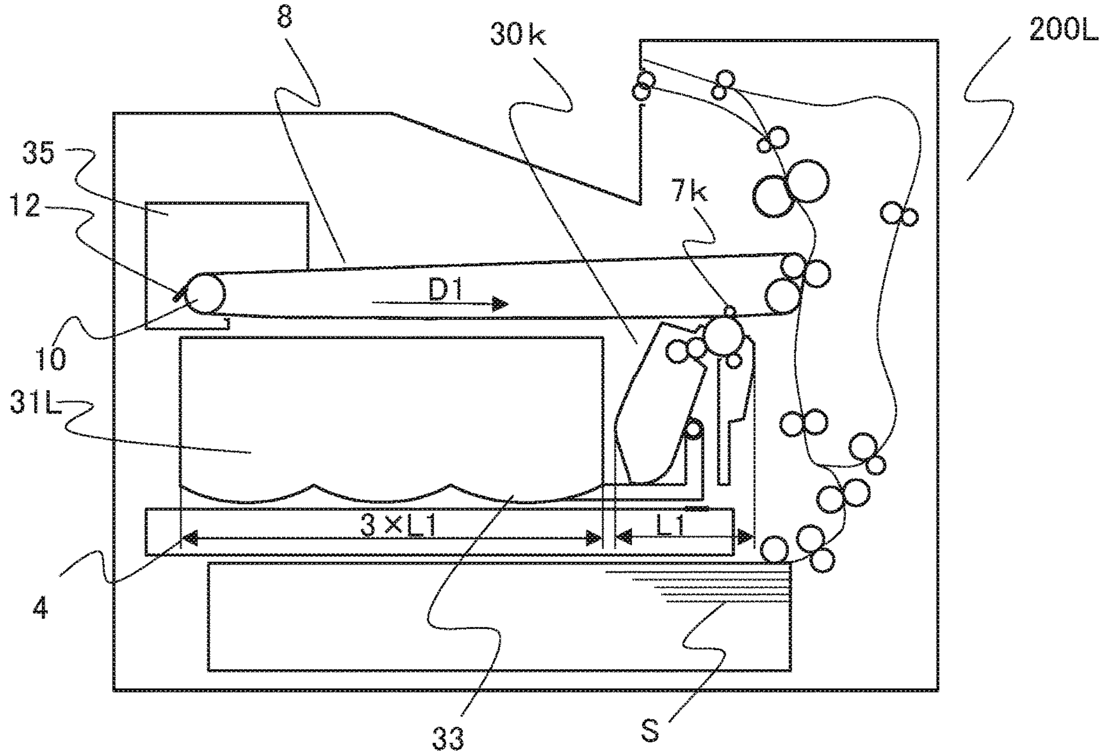

Further, as illustrated in FIG. 13B, the capacity of the toner cartridge can be expanded by utilizing the space in which the process cartridges 30*y*, 30*m*, and 30*c* have been mounted in the color image forming apparatus 1C. For example, if the width of the process cartridge in the conveyance direction D1 of the intermediate transfer belt 8 is denoted as L1, the width of the toner cartridge in the D1 direction can be increased up to a width of the mounting space in which the process cartridges 30*y*, 30*m*, and 30*c* are mounted, that is, three times the length of L1. In other words, according to the present embodiment, when viewed in the rotational axis direction of the image bearing member, the width of the toner cartridge in the moving direction of the belt is greater than the width of the process cartridge in the moving direction of the belt and not more than three times the width of the process cartridge. As described, according to the present embodiment, the image forming apparatus can be configured as a monochrome image forming apparatus 200L equipped with a toner cartridge having a greater capacity compared to the configuration example illustrated in FIG. 13A. Thereby, running costs can be reduced greatly.

Further according to the color image forming apparatus 1C, multiple types of toner cartridges with different toner capacities can be prepared, as long as they can be mounted within the space to which the process cartridges 30*y*, 30*m*, and 30*c* have been mounted. In that case, the user can select the toner cartridge having the most appropriate toner capacity according to use, and the usability can be improved.

Figure 15:
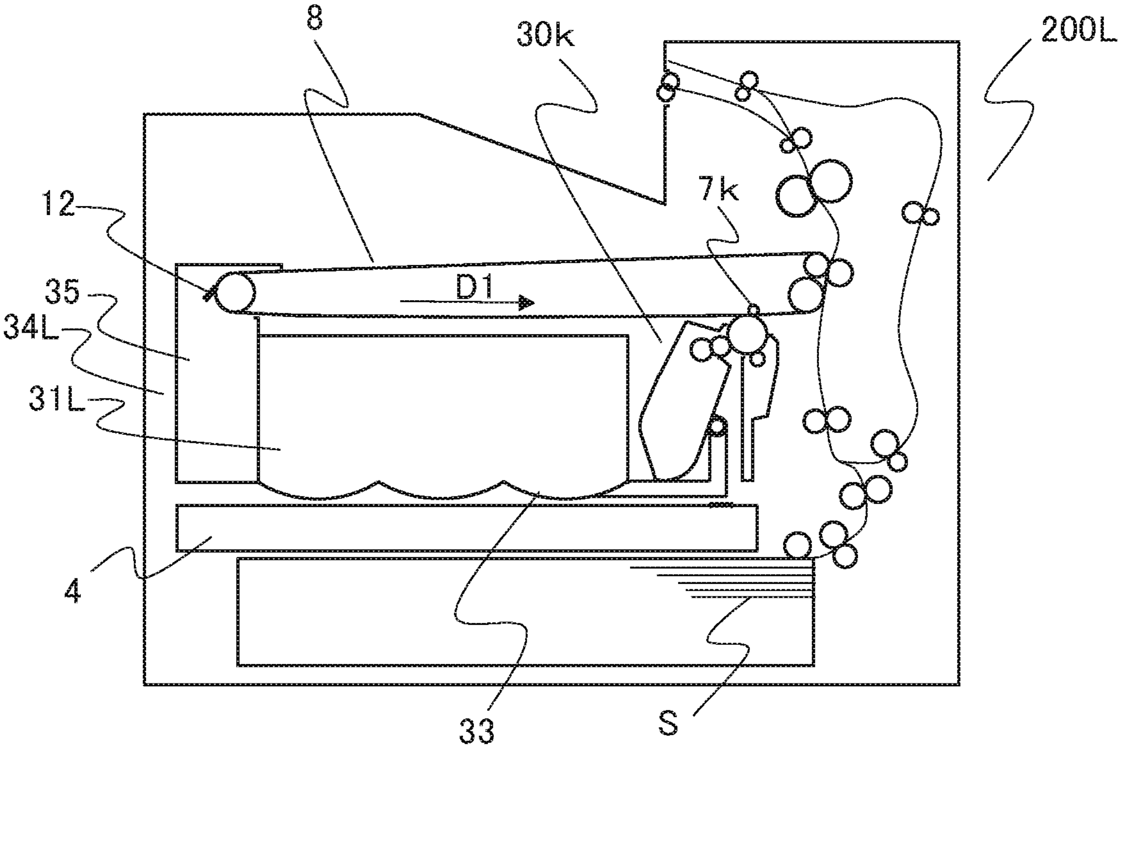
FIG. 15 illustrates a modified example of a toner cartridge according to the fourth embodiment.

Further according to the present embodiment, the arrangement of cartridges in the monochrome image forming apparatus 200 can be varied arbitrarily, and the process cartridge and the toner cartridge can be arranged in this order in the moving direction of the belt. Similar to the first embodiment, a toner cartridge 31L and a waste toner container 35 of the belt cleaner 12 can be configured as an integrated unit 34L as illustrated in FIG. 15. In that case, the number and frequency of replacement can be reduced compared to a case where the toner cartridge 31 and the waste toner container 35 as consumables are replaced independently, and the convenience can be improved. As for the area to be integrated with the toner cartridge 31, it is either possible to integrate only the waste toner container 35 with the toner cartridge 31 or to integrate the entire belt cleaner 12 including the cleaning member 12*a* with the toner cartridge 31.

First Modified Example

Figure 16:
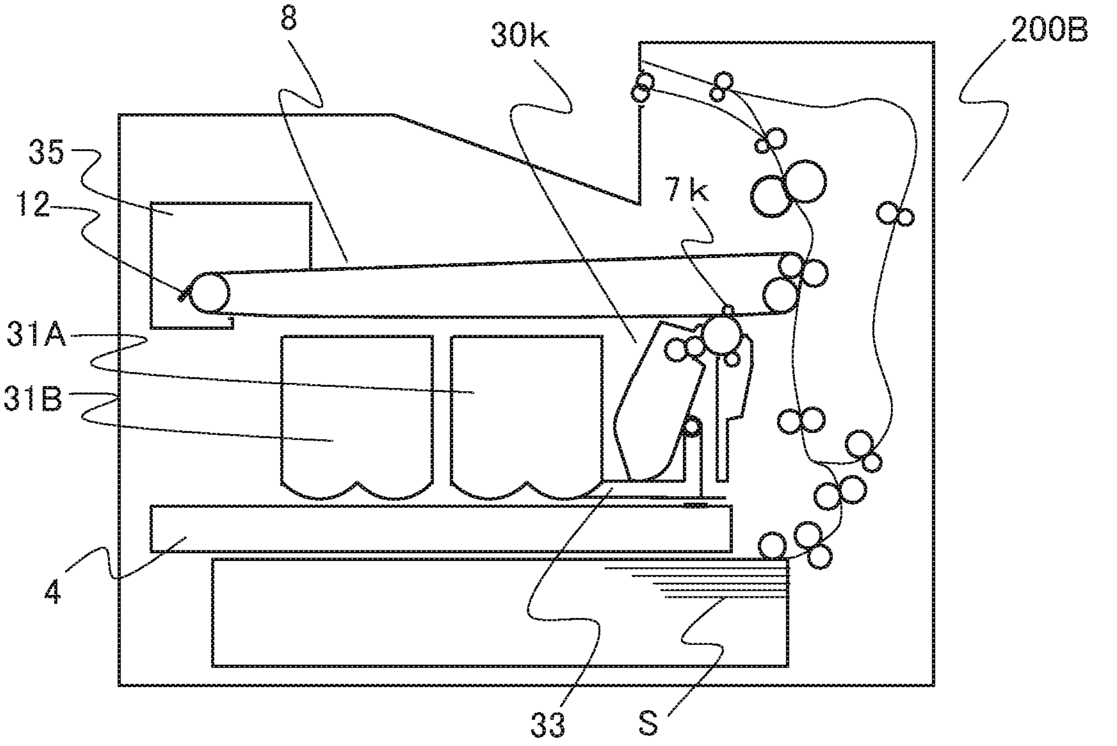
FIG. 16 is a schematic drawing of an image forming apparatus according to a modified example of the fourth embodiment.

The arrangement and configuration of the toner cartridge according to the image forming apparatus of the present embodiment can be varied arbitrarily. For example, multiple toner cartridges 31 can be arranged as a way of utilizing the space in which the process cartridges 30*y*, 30*m*, and 30*c* have been mounted in the color image forming apparatus 1C (FIG. 10B). FIG. 16 is a configuration example of a monochrome image forming apparatus 200B in which two toner cartridges 31A and 31B are arranged within the apparatus body. The process cartridge 30*k* and toner cartridges 31A and 31B serving as multiple toner cartridges are arranged in the apparatus body. The process cartridge 30*k* is arranged along the intermediate transfer belt 8, and the toner cartridge 31A, the toner cartridge 31B, and the process cartridge 30*k* are arranged in this order along the conveyance direction D1 of the intermediate transfer belt 8. The process cartridge 30*k* receives replenishment of black toner from both the two toner cartridges 31A and 31B and forms a toner image using black toner.

In other words, the toner cartridge 31B is an example of another toner cartridge that accommodates the same toner as the toner cartridge 31A and that can be detachably attached to the apparatus body independently from the process cartridge 30*k* and the toner cartridge 31A. Further, the toner cartridge 31B is mounted at a position overlapped with the process cartridge 30*k* and the toner cartridge 31A when viewed in the moving direction (D1) of the intermediate transfer belt 8 in the area between the tension roller 10 and the image bearing member, i.e., the photosensitive drum 2*k*.

Figure 17A:
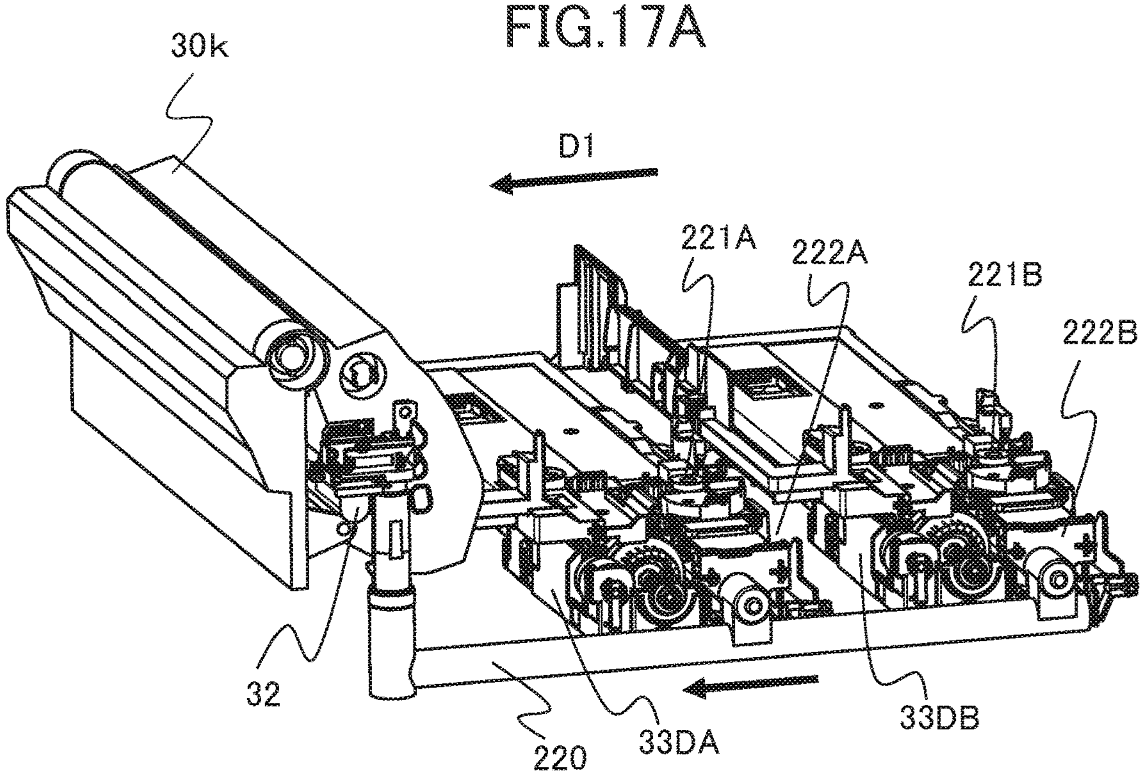
FIGS. 17A and 17B are each an illustration of a toner replenishing path according to the modified example of the fourth embodiment.

A toner conveying portion according to the present modified example will be described with reference to FIGS. 17A and 17B. Similar to the first embodiment, the replenishing port 32 is provided on a rear side of the process cartridge 30*k*, and the replenishing port 32 is communicated with a space inside the developing unit 5*k* of the process cartridge 30*k*. The toner cartridges 31A and 31B are respectively driven by drive units 33DA and 33DB.

Next, a toner conveyance configuration from the two toner cartridges 31A and 31B to the process cartridge 30*k* will be described. The toner cartridges 31A and 31B are provided with discharge ports. As illustrated in FIG. 17A, the apparatus body is provided with buffer units 222A and 222B including toner reception ports 221A and 221B, wherein the buffer units 222A and 222B are respectively driven by the drive units 33DA and 33DB. Each of the buffer units 222A and 222B are connected to a common toner conveying pipe 220.

Figure 17B:
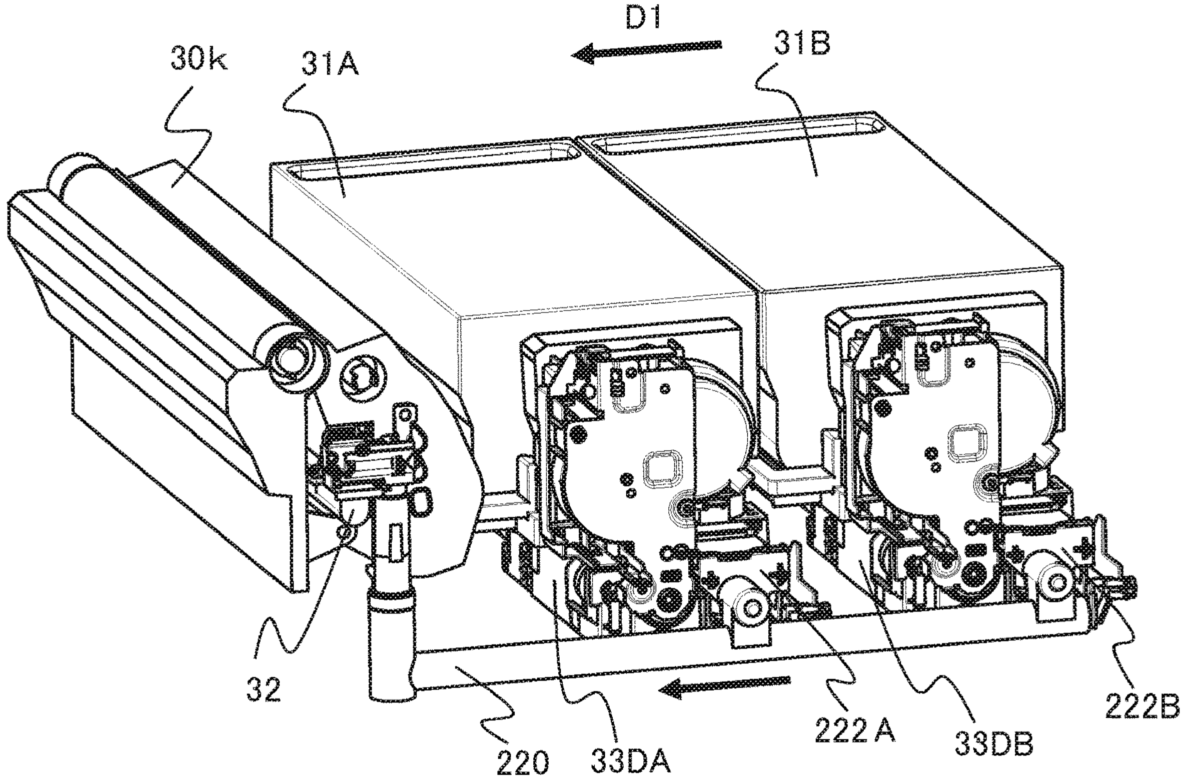

As illustrated in FIG. 17B, in a state where the toner cartridges 31A and 31B are mounted on the apparatus body, the discharge ports of each of the toner cartridges 31A and 31B are connected, i.e., communicated, with the reception ports 221A and 221B. The buffer units 222A and 222B convey toner that has been received from the toner cartridges 31A and 31B through the reception ports 221A and 221B via a screw not shown to the toner conveying pipe 220. The toner conveyed from the buffer units 222A and 222B is merged within the toner conveying pipe 220 and conveyed to the replenishing port 32 of the process cartridge 30*k*.

As described, the respective discharge ports of the plurality of toner cartridges 31A and 31B are connected via the buffer units 222A and 222B and the toner conveying pipe 220 of the apparatus body to the replenishing port 32 of the process cartridge 30*k*. Thereby, even if multiple types of toner cartridges having different toner capacities are not prepared, the toner cartridge can be substantially increased in capacity by mounting a plurality of toner cartridges 31A and 31B to the apparatus body.

Second Modified Example

Figure 24:
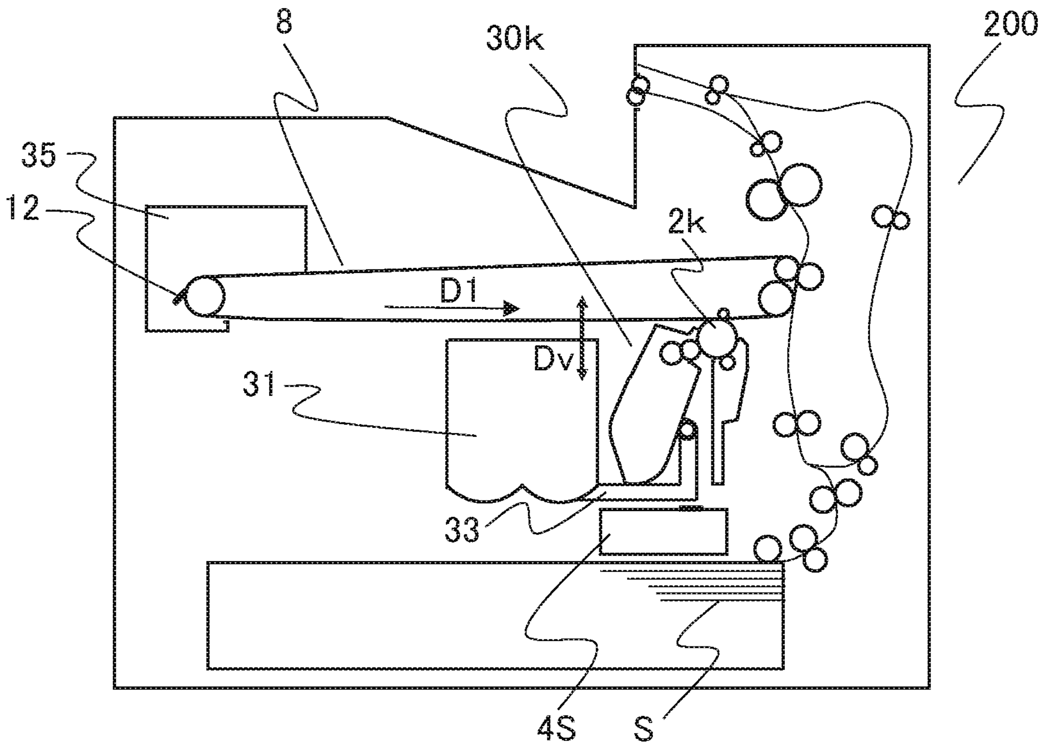
FIG. 24 is a schematic drawing of an image forming apparatus according to a modified example of the fourth embodiment.

The fourth embodiment has illustrated a configuration example where the scanner unit 4 and the intermediate transfer belt 8 having the same size as that of the color image forming apparatus 1C (FIG. 10B) are arranged, but the scanner unit 4 or the intermediate transfer belt 8 can be smaller than those according to the fourth embodiment. For example, as illustrated in FIG. 24, a configuration can be adopted where a width of a scanner unit 4S in the conveyance direction D1 of the intermediate transfer belt 8 is shorter than that of the fourth embodiment. A monochrome image forming apparatus according to the present modified example should include a scanner unit 4S capable of exposing just one photosensitive drum 2*k*, so that a component constituting a part of the scanner unit 4 becomes unnecessary compared to the configuration of the color image forming apparatus 1C (FIG. 10B). In a state where the size of the scanner unit or the intermediate transfer belt is reduced as described above, the toner cartridge 31 may not necessarily be overlapped with the scanner unit 4 and the intermediate transfer belt 8 when viewed in the orthogonal direction Dv.

The above description has illustrated a configuration example where the toner cartridge 31 and the process cartridge 30*k* are arranged along the intermediate transfer belt 8 as the fourth embodiment and the modified example. Further, it has illustrated a configuration example where the space in which the process cartridges 30*y*, 30*m* and 30*c* have been mounted in the color image forming apparatus 1C (FIG. 10B) is utilized to arrange a large-capacity toner cartridge (FIG. 13B) or a plurality of toner cartridges (FIG. 16). Thereby, further reduction of running costs of the image forming apparatus is realized.

Fifth Embodiment

Figure 18:
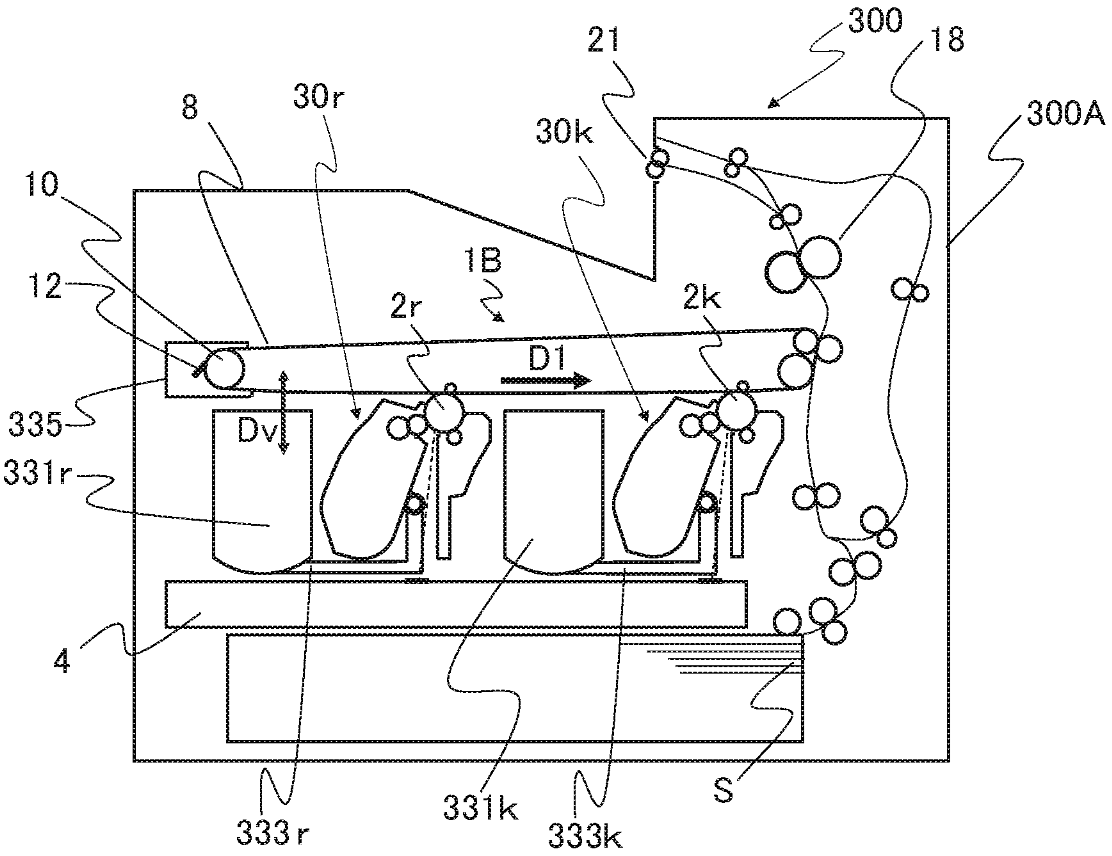
FIG. 18 is a schematic drawing of an image forming apparatus according to a fifth embodiment.

An image forming apparatus 300 according to a fifth embodiment will be described. FIG. 18 is a schematic drawing of the image forming apparatus 300 according to the present embodiment. Hereafter, elements denoted with the same reference numbers as the first embodiment are assumed as having substantially the same structures and functions as the first embodiment.

The image forming apparatus 300 according to the present embodiment can also be combined with the postprocessing apparatus 6 (FIG. 1) performing the biding process of sheets S to constitute the image forming system 1S, similar to the image forming apparatus 1 of the first embodiment. In that case, the sheet S discharged from the sheet discharge roller pair 21 is delivered to the postprocessing apparatus 6, temporarily supported on the binding device 25 in the postprocessing apparatus 6 to receive a binding process before being discharged as a sheet bundle onto the sheet discharge tray of the postprocessing apparatus 6.

General Configuration of Image Forming Apparatus

The image forming apparatus 300 is an electrophotographic apparatus equipped with the image forming unit 1B of an electrophotographic system in an interior of an apparatus body 300A. The image forming unit 1B includes the intermediate transfer belt 8 serving as an intermediate transfer body, and process cartridges 30*r* and 30*k* arranged along the intermediate transfer belt 8. The respective process cartridges 30*r* and 30*k* are detachably attached to the apparatus body 300A. The process cartridge 30*k* includes the photosensitive drum 2*k* serving as a first image bearing member, and it is a first process cartridge, i.e., first cartridge, that forms images using first toner. The process cartridge 30*r* includes a photosensitive drum 2*r* serving as a second image bearing member, and it is a second process cartridge, i.e., second cartridge, that forms images using second toner.

In the example, the process cartridge 30*k* receives replenishment of toner from a toner cartridge 331*k*, and the process cartridge 30*r* receives replenishment of toner from a toner cartridge 331*r*.

Cartridge Arrangement

The process cartridges 30*r* and 30*k* are arranged along the intermediate transfer belt 8. Then, the toner cartridge 331*r*, the process cartridge 30*r*, the toner cartridge 331*k*, and the process cartridge 30*k* are arranged in this order along the conveyance direction D1 of the intermediate transfer belt 8. In other words, the present embodiment adopts a configuration where a second toner cartridge, a second process cartridge, a first toner cartridge, a first process cartridge, and a transfer portion are arranged in this order in the moving direction of the intermediate transfer belt 8.

The process cartridge 30*k* forms a toner image using black toner, and the process cartridge 30*r* forms a toner image using customized toner. Customized toner can be toner of customized color, such as red, blue, or clear, in other words, transparent toner or colored toner other than black toner, and it can be varied arbitrarily according to the application of use by the user. Further, by using adhesive toner in the process cartridge 30*r* and the toner cartridge 331*r*, a sheet binding process similar to the first embodiment can be performed by the binding device 25. In other words, the process cartridge 30*r* can be suitably applied as a customized process cartridge using toner that differs from the toner mainly used for recording an image on a sheet.

Now, "the apparatus body 300A" of the image forming apparatus 300 refers to the portion of the image forming apparatus 300 excluding the process cartridges 30*r* and 30*k* and the toner cartridges 331*k* and 331*r*. The apparatus body 300A includes a frame part such as a metal frame constituting the frame body of the image forming apparatus 300 and members fixed to the frame body and constitutes a mounting space in which the process cartridges 30*r* and 30*k* and the toner cartridges 331*r* and 331*k* are mounted.

As described, according to the present embodiment, the toner cartridges 331*r* and 331*k* and the process cartridges 30*r* and 30*k* are arranged side by side along the intermediate transfer belt 8. That is, as illustrated in FIG. 18, each of the toner cartridges 331*r* and 331*k* are mounted at a position overlapped with the process cartridges 30*r* and 30*k* when viewed in the conveyance direction D1 of the intermediate transfer belt 8 in the area between the tension roller 10 and the photosensitive drum 2*k*. In other words, each of the first toner cartridge and the second toner cartridge of the present embodiment are mounted at a position overlapped with first process cartridge and the second process cartridge when viewed in the moving direction (D1) of the belt in the area between the tension roller and the first image bearing member.

In the positional relationship with the scanner unit 4, the toner cartridges 331*r* and 331*k* are mounted between the scanner unit 4 and the intermediate transfer belt 8 in the orthogonal direction Dv of the intermediate transfer belt 8. Further, when viewed in the orthogonal direction Dv, the toner cartridges 331*r* and 331*k* are at least partially overlapped with the intermediate transfer belt 8 and the scanner unit 4. The orthogonal direction Dv is a direction orthogonal to the conveyance direction D1 of the intermediate transfer belt 8, specifically, the direction orthogonal to the conveyance direction D1 at the contact position with the photosensitive drum 2*k*, when viewed in the main scanning direction of image forming, i.e., rotational axis direction of the photosensitive drum 2*k*.

That is, the exposure unit according to the present embodiment is arranged such that the first process cartridge and the second process cartridge are interposed between the belt and the exposure unit in the orthogonal direction (Dv) orthogonal to the moving direction (D1) of the belt at the contact portion with the first image bearing member when viewed in the rotational axis direction of the first image bearing member, i.e., the photosensitive drum 2*k*. Further, the first toner cartridge and the second toner cartridge according to the present embodiment are arranged on the same side as the first process cartridge and the second process cartridge with respect to the belt in the orthogonal direction (Dv) and on the same side as the first process cartridge and the second process cartridge with respect to the exposure unit in the orthogonal direction (Dv), when viewed in the rotational axis direction of the first image bearing member. According to this arrangement, the configuration of the image forming apparatus 300 utilizing the same apparatus body as the color image forming apparatus 1C can be realized.

The scanner unit 4 or the intermediate transfer belt 8 can be configured shorter in the conveyance direction D1 than the embodiment illustrated in FIG. 18. That is, the toner cartridges 331*r* and 331*k* may not necessarily be overlapped with the scanner unit 4 and the intermediate transfer belt 8 when viewed in the orthogonal direction Dv. Further, if an LED exposure unit is used as an exposure unit, for example, the toner cartridge 31 may not necessary be arranged between the exposure unit and the intermediate transfer belt 8 in the orthogonal direction Dv.

Toner Replenishing Path

Figure 19:
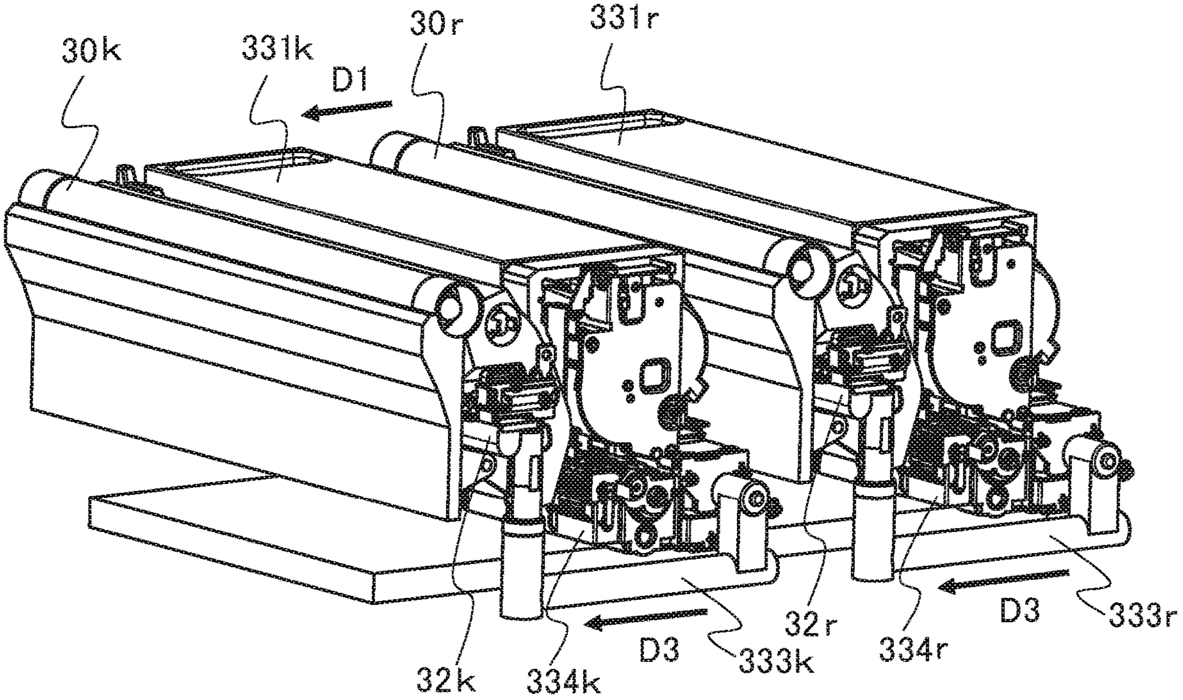
FIG. 19 is a view illustrating a toner replenishing path according to the fifth embodiment.

Next, a toner replenishing configuration of the process cartridges 30*r* and 30*k* will be described with reference to FIG. 19. FIG. 19 is a perspective view illustrating a toner replenishing path, and it illustrates a state where the image forming apparatus 300 is viewed from a rear side (depth side of FIG. 18).

The replenishing port 32*k* of the process cartridge 30*k* is connected to the discharge port of the toner cartridge 331*k* via a toner conveying pipe 333*k* provided on the apparatus body 300A. A screw not shown is arranged in the toner conveying pipe 333*k*, and the screw is driven by a drive unit 334*k*. Toner is conveyed by the screw from the toner cartridge 331*k* toward the process cartridge 30*k* in direction D3, and toner is replenished to the process cartridge 30*k*. The direction D3 is a direction from the toner cartridge 331*k* positioned upstream of the intermediate transfer belt 8 in the conveyance direction D1 toward the direction of the process cartridge 30*k* positioned downstream thereof, and preferably approximately parallel to the conveyance direction D1.

Similarly, a replenishing port 32*r* of the process cartridge 30*r* is connected to the discharge port of the toner cartridge 331*r* via a toner conveying pipe 333*r* provided on the apparatus body 300A. A screw not shown is arranged in the toner conveying pipe 333*r*, and the screw is driven by a drive unit 334*r*. Toner is conveyed by the screw from the toner cartridge 331*r* toward the process cartridge 30*r* in direction D3, and toner is replenished to the process cartridge 30*r*.

The toner conveying pipes 333*r* and 333*k* are set to have approximately an equivalent conveyance distance, and preferably composed of the same components. Similarly, the drive units 334*r* and 334*k* or the replenishing ports 32*r* and 32*k* are preferably formed of the same components. By using common components, cutting of costs and improvement of quality can be expected.

Further according to the present embodiment, in order to arrange two process cartridges 30*k* and 30*r* and two toner cartridges 331*k* and 331*r* along the intermediate transfer belt 8, the toner cartridge serving as a replenishing source and the process cartridge serving as a replenishing destination are arranged adjacently. That is, the process cartridge 30*k* of back toner and the toner cartridge 331*k* of black toner are arranged adjacently and the process cartridge 30*r* of customized color and the toner cartridge 331*r* of customized color are arranged adjacently with respect to the conveyance direction D1 of the intermediate transfer belt 8. Accordingly, the toner replenishing path can be shortened compared to other arrangements, so that costs can be cut down due to downsizing of components, and the space below the intermediate transfer belt 8 can be utilized effectively.

The toner conveying pipe 333*k* for conveying black toner functions as a first conveying pipe that extends from upstream toward downstream in the moving direction (D1) of the belt to convey the first toner from the first toner cartridge to the first process cartridge. The toner conveying pipe 333*r* for conveying customized toner functions as a second conveying pipe that extends from upstream toward downstream in the moving direction (D1) of the belt to convey the second toner from the second toner cartridge to the second process cartridge.

The toner conveying pipes 333*r* and 333*k* are mutually overlapped when viewed in the moving direction (D1) of the belt. According to this arrangement, in a case where the two sets of toner cartridges and process cartridges are arranged so that the toner cartridge and the process cartridge of each set are arranged adjacent one another, the configuration for replenishing toner can be arranged in a compact manner.

Toner Replacement Operation and Scanner Unit

Figure 20:
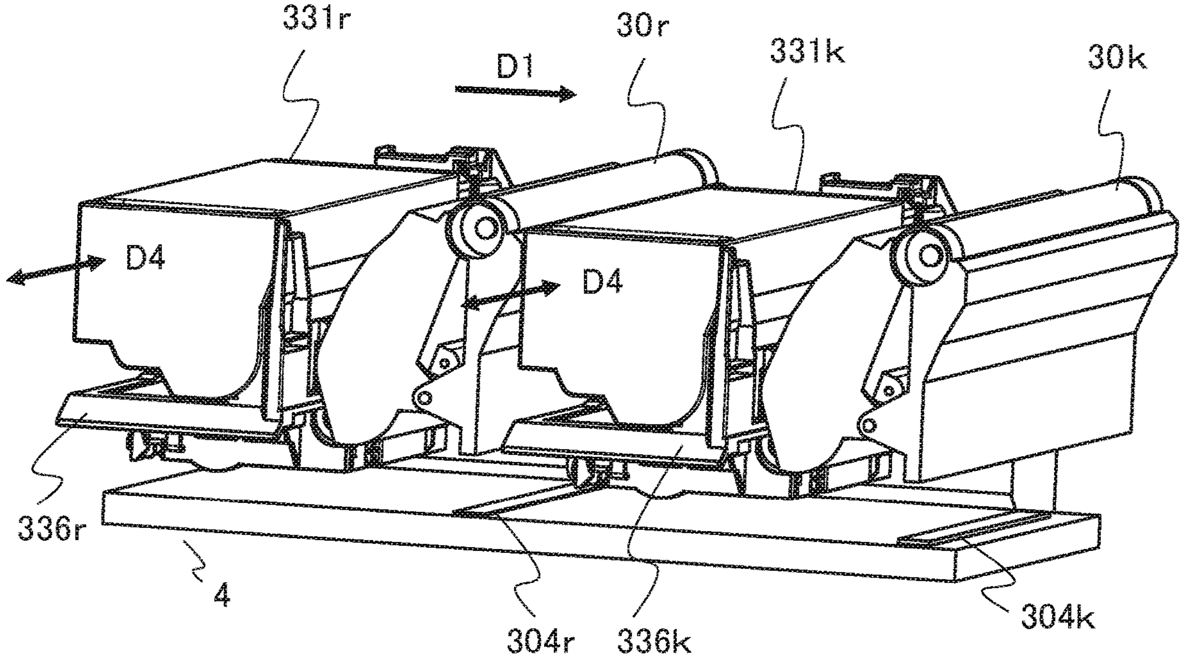
FIG. 20 is a view illustrating a toner replacement operation and a scanner unit according to the fifth embodiment.

FIG. 20 is a view illustrating a toner replacement operation and a scanner unit arrangement according to the present embodiment. The toner cartridge 331*k* is positioned in the apparatus body 300A by a cartridge rail 336*k*, and during toner replacement, the toner cartridge 331*k* is removed and inserted along the cartridge rail 336*k* in direction D4. Similarly, the toner cartridge 331*r* is removed and inserted along a cartridge rail 336*r*. Direction D4 refers to a direction intersecting the conveyance direction D1 of the intermediate transfer belt 8, and it is preferably approximately parallel to the main scanning direction of image forming, i.e., rotational axis direction of the photosensitive drum, that is orthogonal to the conveyance direction D1.

The scanner unit 4 irradiates laser light to the process cartridges 30*r* and 30*k* and forms electrostatic latent images on the surface of the photosensitive drums. Laser light is irradiated to the process cartridge 30*r* through a dustproof glass 304*r* and irradiated to the process cartridge 30*k* through a dustproof glass 304*k*. The scanner unit 4 is arranged to extend across both the process cartridges 30*r* and 30*k* and the toner cartridges 331*r* and 331*k*. Therefore, the scanner unit 4 (including four dustproof glasses 304*k*) adopted in the color image forming apparatus 1C (FIG. 10B) can be used in common for the scanner unit 4, for example.

According to the present embodiment, the scanner unit 4 is arranged below the process cartridges 30*r* and 30*k*, and the process cartridges 30*r* and 30*k* and the transfer portion are arranged in this order along the conveyance direction D1 of the intermediate transfer belt 8. Therefore, compared to a case where the scanner unit is arranged above the process cartridge, the distance in which the toner images of the process cartridges 30*r* and 30*k* reach the transfer portion can be shortened. That is, in a configuration where the process cartridges 30*r* and 30*k* and the scanner unit 4 are arranged above the intermediate transfer belt 8 (refer to FIG. 9, for example), the toner image transferred to an upper stretched portion of the intermediate transfer belt 8 reaches the transfer portion via a lower stretched portion. The upper stretched portion is a portion stretched on upper sides of at least two rollers stretching the intermediate transfer belt 8, and the lower stretched portion is a portion stretched on lower sides of at least two rollers. In contrast to the configuration of FIG. 9, according to the present embodiment, the toner image transferred to the lower stretched portion of the intermediate transfer belt 8 reaches the transfer portion without passing through the upper stretched portion. In other words, the toner image reaches the transfer portion faster, so that the FPOT is shortened.

The above-mentioned advantage of shortening the FPOT is also realized in other embodiments (such as FIGS. 1 and 10A) in which the process cartridges 30*r* and 30*k* and the scanner unit 4 are arranged below the intermediate transfer belt 8. Further, the present embodiment utilizes an image forming apparatus adopting a configuration where the sheet S is conveyed from the lower side toward the upper side at the transfer portion, which is so-called a vertical conveyance type system, but if the conveyance path configuration in the image forming apparatus is varied, the arrangements of the process cartridge and the scanner unit are also varied.

Sixth Embodiment

Figure 21:
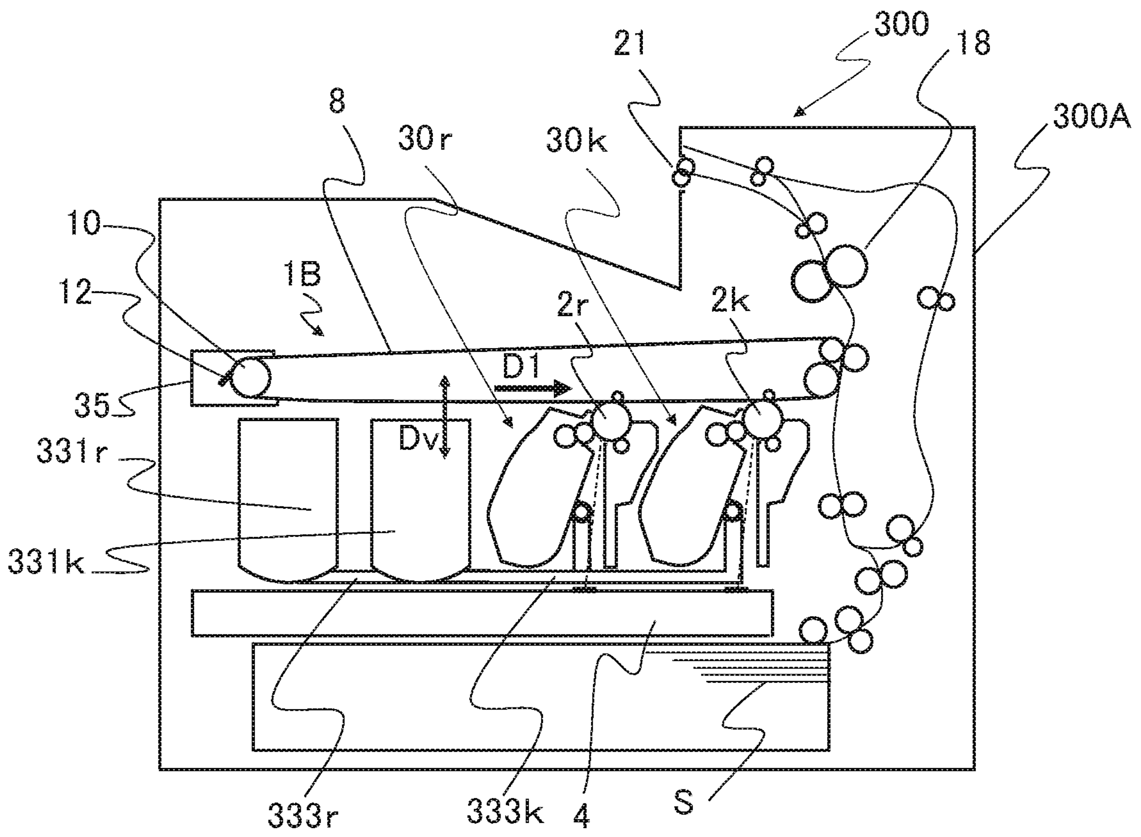
FIG. 21 is a schematic drawing of an image forming apparatus according to a sixth embodiment.

An image forming apparatus 300 according to a sixth embodiment will be described. FIG. 21 is a schematic drawing of the image forming apparatus 300 according to the present embodiment. Hereafter, elements denoted with the same reference numbers as the first embodiment are assumed as having substantially the same structures and functions as the first embodiment.

Similar to the image forming apparatus 1 of the first embodiment, the image forming apparatus 300 according to the present embodiment can also be combined with the postprocessing apparatus 6 (FIG. 1) that performs the binding process of the sheets S to constitute the image forming system 1S. In that case, the sheets S discharged from the sheet discharge roller pair 21 are delivered to the postprocessing apparatus 6, temporarily supported on the binding device 25 in the postprocessing apparatus 6 to receive a binding process before being discharged as a sheet bundle onto a sheet discharge tray of the postprocessing apparatus 6.

General Configuration of Image Forming Apparatus

The image forming apparatus 300 is an electrophotographic apparatus equipped with an image forming unit 1B adopting an electrophotographic system arranged in the apparatus body 300A. The image forming unit 1B includes an intermediate transfer belt 8 serving as the intermediate transfer body, and process cartridges 30*r* and 30*k* arranged along the intermediate transfer belt 8. The respective process cartridges 30*r* and 30*k* are detachably attached to the apparatus body 300A. The process cartridge 30*k* is a first process cartridge, i.e., first cartridge, that forms images using first toner, and the process cartridge 30*r* is a second process cartridge, i.e., second cartridge, that forms images using second toner.

The process cartridge 30*k* receives replenishment of toner from the toner cartridge 331*k*, and the process cartridge 30*r* receives replenishment of toner from the toner cartridge 331*r*.

Cartridge Arrangement

The process cartridges 30*r* and 30*k* are arranged along the intermediate transfer belt 8. The toner cartridge 331*r*, the toner cartridge 331*k*, the process cartridge 30*r*, and the process cartridge 30*k* are arranged in this order along the conveyance direction D1 of the intermediate transfer belt 8. In other words, the present embodiment adopts a configuration where the second toner cartridge, the first toner cartridge, the second process cartridge, the first process cartridge, and the transfer portion are arranged in this order in the moving direction of the intermediate transfer belt 8.

The process cartridge 30*k* forms a toner image using black toner, and the process cartridge 30*r* forms a toner image using customized toner. Customized toner can be toner of a customized color, such as red, blue, or clear, in other words, transparent toner or colored toner other than black toner, and it can be varied arbitrarily according to the application of use by the user. Further, by using adhesive toner in the process cartridge 30*r* and the toner cartridge 331*r*, a sheet binding process similar to the first embodiment can be performed by the binding device 25. In other words, the process cartridge 30*r* can be suitably adopted as a customized process cartridge using toner that differs from the toner mainly used for recording an image on a sheet.

Now, "the apparatus body 300A" of the image forming apparatus 300 refers to the portion of the image forming apparatus 300 excluding the process cartridges 30*r* and 30*k* and the toner cartridges 331*r* and 331*k*. The apparatus body 300A includes a frame part such as a metal frame constituting the frame body of the image forming apparatus 300 and members fixed to the frame body and constitutes a mounting space in which the process cartridges 30*r* and 30*k* and the toner cartridges 331*r* and 331*k* are mounted.

As described, also according to the present embodiment, the toner cartridges 331*r* and 331*k* and the process cartridges 30*r* and 30*k* are arranged side by side along the intermediate transfer belt 8. That is, as illustrated in FIG. 21, each of the toner cartridges 331*r* and 331*k* are mounted at a position overlapped with the process cartridges 30*r* and 30*k* when viewed in the conveyance direction D1 of the intermediate transfer belt 8 in the area between the tension roller 10 and the photosensitive drum 2*k*. In other words, each of the first toner cartridge and the second toner cartridge of the present embodiment are mounted at a position overlapped with first process cartridge and the second process cartridge when viewed in the moving direction of the belt in the area between the tension roller and the first image bearing member.

In the positional relationship with the scanner unit 4, the toner cartridges 331*r* and 331*k* are mounted between the scanner unit 4 and the intermediate transfer belt 8 in the orthogonal direction Dv of the intermediate transfer belt 8. Further, when viewed in the orthogonal direction Dv, the toner cartridges 331*r* and 331*k* are at least partially overlapped with the intermediate transfer belt 8 and the scanner unit 4. The orthogonal direction Dv is a direction orthogonal to the conveyance direction D1 of the intermediate transfer belt 8, specifically, the direction orthogonal to the conveyance direction D1 at the contact position with the photosensitive drum 2*k*, when viewed in the main scanning direction of image forming, i.e., rotational axis direction of the photosensitive drum 2*k*.

That is, the exposure unit according to the present embodiment is arranged such that the first process cartridge and the second process cartridge are interposed between the belt and the exposure unit in the orthogonal direction (Dv) orthogonal to the moving direction (D1) of the belt at the contact portion with the first image bearing member when viewed in the rotational axis direction of the first image bearing member, i.e., the photosensitive drum 2*k*. Further, the first toner cartridge and the second toner cartridge according to the present embodiment are arranged on the same side as the first process cartridge and the second process cartridge with respect to the belt in the orthogonal direction (Dv) and on the same side as the first process cartridge and the second process cartridge with respect to the belt in the orthogonal direction (Dv) when viewed in the rotational axis direction of the first image bearing member. According to this arrangement, the configuration of the image forming apparatus 300 utilizing a same apparatus body as the color image forming apparatus 1C can be realized.

The scanner unit 4 or the intermediate transfer belt 8 can be configured shorter in the conveyance direction D1 than the embodiment illustrated in FIG. 21. That is, the toner cartridges 331*r* and 331*k* may not necessarily be overlapped with the scanner unit 4 and the intermediate transfer belt 8 when viewed in the orthogonal direction Dv. Further, if an LED exposure unit is used as an exposure unit, for example, the toner cartridge 31 may not necessary be arranged between the exposure unit and the intermediate transfer belt 8 in the orthogonal direction Dv.

Toner Replenishing Path

Figure 22:
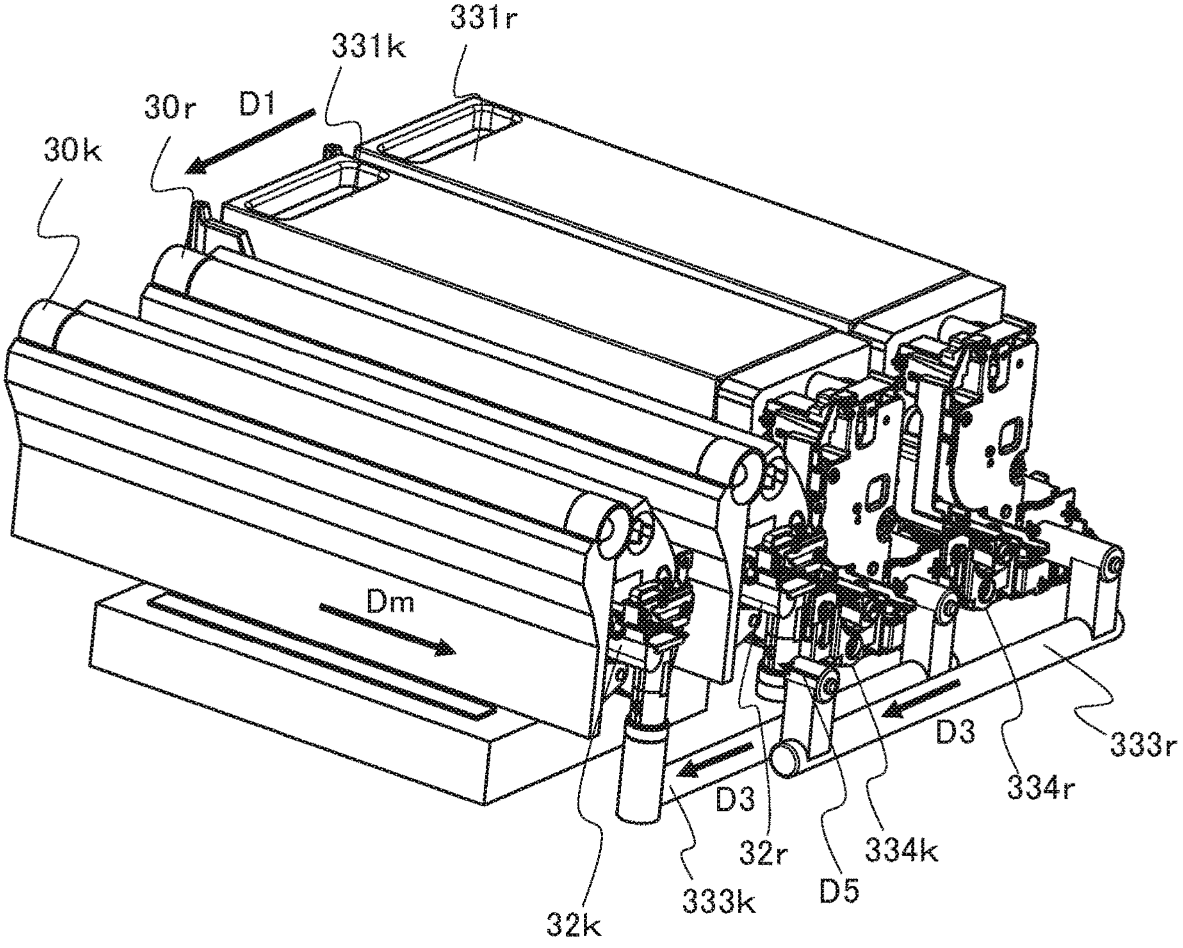
FIG. 22 illustrates a toner replenishing path according to the sixth embodiment.

Next, a toner replenishing configuration of the process cartridges 30*r* and 30*k* will be described with reference to FIG. 22. FIG. 22 is a perspective view illustrating a toner replenishing path, and it illustrates a state where the image forming apparatus 300 is viewed from a rear side (depth side of FIG. 21).

The replenishing port 32*k* of the process cartridge 30*k* is connected to the discharge port of the toner cartridge 331*k* via a toner conveying pipe 333*k* provided on the apparatus body 300A. A screw not shown is arranged in the toner conveying pipe 333*k*, and the screw is driven by a drive unit 334*k*. Toner is conveyed by the screw from the toner cartridge 331*k* toward the process cartridge 30*k* in direction D3, and toner is replenished to the process cartridge 30*k*. The direction D3 is a direction from upstream toward downstream in the conveyance direction D1 of the intermediate transfer belt 8, and preferably approximately parallel to the conveyance direction D1.

Similarly, a replenishing port 32*r* of the process cartridge 30*r* is connected to the discharge port of the toner cartridge 331*r* via a toner conveying pipe 333*r* provided on the apparatus body 300A. A screw not shown is arranged in the toner conveying pipe 333*r*, and the screw is driven by a drive unit 334*r*. Toner is conveyed by the screw from the toner cartridge 331*r* toward the process cartridge 30*r* in direction D3, and toner is replenished to the process cartridge 30*r*.

The toner conveying pipe 333*r* is positioned on the rear side (depth side of FIG. 33) with respect to the toner conveying pipe 333*k* and arranged approximately parallel with the toner conveying pipe 333*k*. Therefore, toner conveyed in the direction D3 changes its direction upward and then conveyed in direction D5 and reaches the replenishing port 32*r*. The direction D5 is a direction intersecting the direction D3 and upward-downward direction (vertical direction), and preferably approximately parallel with the main scanning direction of image forming, i.e., rotational axis direction of the photosensitive drum.

Toner Replacement Operation and Scanner Unit

Figure 23:
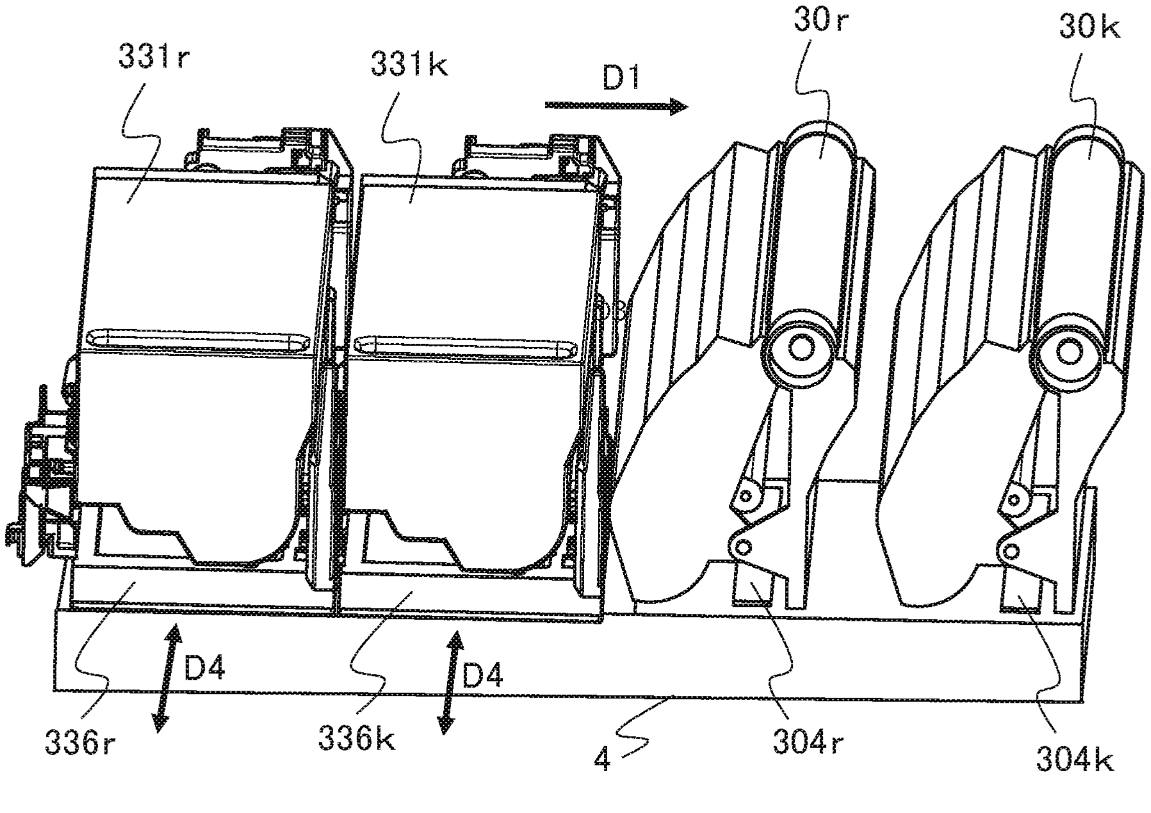
FIG. 23 is a view illustrating a toner replacement operation and a scanner unit according to the sixth embodiment.

FIG. 23 is a view illustrating a toner replacement operation and a scanner unit arrangement according to the present embodiment. The toner cartridge 331*k* is positioned in the apparatus body 300A via a cartridge rail 336*k*, and during toner replacement, the toner cartridge 331*k* is removed and inserted along the cartridge rail 336*k* in direction D4. Similarly, the toner cartridge 331*r* is removed and inserted along a cartridge rail 336*r* in direction D4. Direction D4 refers to a direction intersecting the conveyance direction D1 of the intermediate transfer belt 8, and it is preferably approximately parallel to the main scanning direction of image forming, i.e., rotational axis direction of the photosensitive drum, orthogonal to the conveyance direction D1.

The scanner unit 4 irradiates laser light to the process cartridges 30*r* and 30*k* and forms electrostatic latent images on the surface of the photosensitive drums. Laser light is irradiated to the process cartridge 30*r* through dustproof glass 304*r* and irradiated to the process cartridge 30*k* through a dustproof glass 304*k*. Therefore, the scanner unit 4 (including four dustproof glasses 304*k*) adopted in the color image forming apparatus 1C (FIG. 10B) can be used in common for the scanner unit 4, for example.

According to the present embodiment, the two toner cartridges 331*r* and 331*k* are arranged upstream of the two process cartridges 30*k* and 30*r* in the conveyance direction D1 of the intermediate transfer belt 8, so that they are arranged keeping a distance from the transfer portion and the fixing unit 18. Compared to the embodiment illustrated in FIG. 18, for example, the distance between the toner cartridge 331*k* and the fixing unit 18 is widened. Therefore, toner accommodated in the toner cartridges 331*r* and 331*k* will not be affected easily by the heat generated by the fixing unit 18 serving as the heat source, and for example, the deterioration of productivity by rising of temperature inside the apparatus can be suppressed.

The toner conveying pipe 333*k* for conveying black toner functions as a first conveying pipe that extends from upstream toward downstream in the moving direction (D1) of the belt and conveying first toner from the first toner cartridge to the first process cartridge. The toner conveying pipe 333*r* for conveying customized toner functions as a second conveying pipe that extends from upstream toward downstream in the moving direction (D1) of the belt and conveying second toner from the second toner cartridge to the second process cartridge.

The toner conveying pipes 333*r* and 333*k* are mutually overlapped when viewed in the main scanning direction Dm of image forming, that is, rotational axis direction of the photosensitive drum 2*k*. According to this arrangement, customized toner, i.e., second toner, discharged from the toner cartridge 331*r* can be replenished to the process cartridge 30*r* arranged at a position beyond the toner cartridge 331*k* accommodating black toner, i.e., first toner, in the moving direction (D1) of the belt. Further, black toner, i.e., first toner, discharged from the toner cartridge 331*k* can be replenished to the process cartridge 30*k* arranged at a position beyond the process cartridge 30*r* using customized toner, i.e., second toner, in the moving direction (D1) of the belt.

OTHER EMBODIMENTS

An image forming system in which the binding device 25 is arranged on an exterior of the image forming apparatus 1 or 100 has been described in the first to sixth embodiments described above, but the image forming system can also adopt a configuration where the binding device 25 is incorporated in the image forming apparatus 1 or 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-184503, filed on Nov. 4, 2020, and 2021-146732, filed on Sep. 9, 2021, which are hereby incorporated by reference herein in their entirety.

What is claimed is:

1. An image forming apparatus comprising:

an apparatus body;

a developing cartridge including a developing roller rotatable about a rotational axis and configured to bear toner, the developing cartridge being detachably attached to the apparatus body in a direction of the rotational axis;

a first toner cartridge configured to accommodate the toner to be replenished to the developing cartridge and detachably attached to the apparatus body independently from the developing cartridge in the direction of the rotational axis; and a second toner cartridge configured to accommodate toner to be replenished to the developing cartridge and detachably attached to the apparatus body independently from the developing cartridge and the first toner cartridge in the direction of the rotational axis, wherein a longitudinal direction of the developing cartridge, a longitudinal direction of the first toner cartridge, and a longitudinal direction of the second toner cartridge extend in the direction of the rotational axis, and wherein the developing cartridge, the first toner cartridge, and the second toner cartridge are aligned in a direction intersecting with the rotational axis.

2. The image forming apparatus according to claim 1, wherein the developing cartridge, the first toner cartridge, and the second toner cartridge are aligned in a horizontal direction.

3. The image forming apparatus according to claim 1, wherein the developing cartridge includes a photosensitive member to which the toner is supplied by the developing roller.

4. The image forming apparatus according to claim 3, further comprising:

an image bearing member to which a toner image is transferred from the photosensitive member; and an exposure unit configured to expose the photosensitive member, the exposure unit being provided opposite to the image bearing member across the photosensitive member in a first direction when viewed in the direction of the rotational axis, wherein the developing cartridge, the first toner cartridge, and the second toner cartridge are aligned in a second direction intersecting with the first direction when viewed in the direction of the rotational axis.

5. The image forming apparatus according to claim 4, wherein the exposure unit is a laser scanner configured to irradiate a laser light to the photosensitive member.

6. The image forming apparatus according to claim 5, wherein the image bearing member is an endless belt.

7. The image forming apparatus according to claim 1, further comprising:

a toner conveying passage through which the toner is conveyed from the first toner cartridge to the developing cartridge, the toner conveying passage being provided downstream of the first toner cartridge in an attaching direction in which the developing cartridge is attached to the apparatus body in the direction of the rotational axis.

8. The image forming apparatus according to claim 1, further comprising:

a toner conveying passage through which the toner is conveyed from the first toner cartridge to the developing cartridge and from the second toner cartridge to the developing cartridge, the toner conveying passage being provided downstream of the first toner cartridge and the second toner cartridge in an attaching direction in which the developing cartridge is attached to the apparatus body in the direction of the rotational axis.

* * * * *